United States Patent
Zhang

(10) Patent No.: US 10,957,004 B2
(45) Date of Patent: Mar. 23, 2021

(54) WATERMARK PROCESSING METHOD AND DEVICE

(71) Applicant: Alibaba Group Holding Limited, Grand Cayman (KY)

(72) Inventor: Tianruo Zhang, Beijing (CN)

(73) Assignee: Alibaba Group Holding Limited

( * ) Notice: Subject to any disclaimer, the term of this patent is extended or adjusted under 35 U.S.C. 154(b) by 165 days.

(21) Appl. No.: 16/258,362

(22) Filed: Jan. 25, 2019

(65) Prior Publication Data

US 2019/0236746 A1 Aug. 1, 2019

(30) Foreign Application Priority Data

Jan. 26, 2018 (CN) .......................... 2018 1 0076883

(51) Int. Cl.
  *G06T 1/00* (2006.01)
  *G06F 21/16* (2013.01)
  *H04N 21/00* (2011.01)

(52) U.S. Cl.
  CPC ............ *G06T 1/0021* (2013.01); *G06F 21/16* (2013.01); *G06T 1/0028* (2013.01); *H04N 21/00* (2013.01); *G06F 2221/0733* (2013.01)

(58) Field of Classification Search
  None
  See application file for complete search history.

(56) References Cited

U.S. PATENT DOCUMENTS 6,222,932 B1 * 4/2001 Rao ....................... G06T 1/0028
                                          380/54
6,823,074 B1   11/2004 Sugaya et al.
(Continued)

FOREIGN PATENT DOCUMENTS

CN   102547254   7/2012
CN   103533457   1/2014
(Continued)

OTHER PUBLICATIONS

Invitation to Pay Additional Fees dated Apr. 2, 2019 for PCT Application No. PCT/US19/15271, "Watermark Processing Method and Device", 2 pages.
(Continued)

*Primary Examiner* — Vu Le
*Assistant Examiner* — Tracy Mangialaschi
(74) *Attorney, Agent, or Firm* — Lee & Hayes, P.C.

(57) ABSTRACT

A watermark processing method including generating watermark parameters for original multimedia data; performing watermark superposition processing on the original multimedia data according to the watermark parameters to obtain first multimedia data; encoding the first multimedia data to obtain a first multimedia code stream and encapsulating the watermark parameters into the first multimedia code stream to obtain a second multimedia code stream; and sending the second multimedia code stream to a terminal device so that the terminal device performs watermark inverse superposition processing on the first multimedia data according to the watermark parameters to obtaining the original multimedia data. The watermark processing method and apparatus prevent unlicensed broadcasting and hotlinking through a watermark and meanwhile do not display the watermark at the terminal device with valid content licensing of the broadcasted content during broadcasting to avoid affecting watch experience of audience.

14 Claims, 14 Drawing Sheets

(56) References Cited

U.S. PATENT DOCUMENTS

| | | |
|---|---|---|
| 7,162,035 B1 | 1/2007 | Durst et al. |
| 7,515,730 B2 | 4/2009 | Tian et al. |
| 7,859,551 B2 | 12/2010 | Bulman et al. |
| 8,165,342 B2 | 4/2012 | Reed et al. |
| 8,423,778 B2 | 4/2013 | Mohanty |
| 8,488,837 B2 | 7/2013 | Bae et al. |
| 8,964,119 B2 | 2/2015 | Sagliocco et al. |
| 9,064,260 B1 | 6/2015 | Fraser et al. |
| 9,154,802 B2 | 10/2015 | Tanaka et al. |
| 9,363,083 B1 | 6/2016 | Durst et al. |
| 10,275,675 B1 | 4/2019 | Fraser |
| 2002/0138843 A1 | 9/2002 | Samaan et al. |
| 2002/0186861 A1 | 12/2002 | Echizen et al. |
| 2003/0059082 A1 | 3/2003 | Suzuki et al. |
| 2003/0179900 A1 | 9/2003 | Tian et al. |
| 2006/0209349 A1* | 9/2006 | Tabata ............... H04N 1/32304 358/3.28 |
| 2006/0239500 A1* | 10/2006 | Meyer ............... H04N 1/32165 382/100 |
| 2009/0132825 A1* | 5/2009 | Mohanty ........... H04N 21/8358 713/176 |
| 2012/0203362 A1 | 8/2012 | Parvaix et al. |
| 2012/0281871 A1* | 11/2012 | Reed ................. H04N 1/32309 382/100 |
| 2014/0219495 A1 | 8/2014 | Hua |
| 2016/0150297 A1* | 5/2016 | Petrovic ............... H04N 19/65 725/25 |
| 2018/0278425 A1 | 9/2018 | Xu et al. |
| 2018/0292951 A1 | 10/2018 | Kato et al. |

FOREIGN PATENT DOCUMENTS

| | | |
|---|---|---|
| CN | 104902282 | 9/2015 |
| CN | 105260980 | 1/2016 |
| JP | 2014225753 | 12/2014 |

OTHER PUBLICATIONS

PCT Search Report and Written OPinion dated Jun. 12, 2019, for the PCT Application No. PCT/US19/15271, 12 pages.

CN Office Action dated Dec. 29, 2020, for the CN Application No. 201810076883.2, 12 pages.

* cited by examiner

WATERMARK PROCESSING METHOD AND DEVICE

CROSS REFERENCE TO RELATED PATENT APPLICATIONS

The present disclosure claims priority to Chinese Patent Application No. 201810076883.2 filed on 26 Jan. 2018 and entitled "Watermark Processing Method and Device," which is incorporated herein by reference in its entirety.

TECHNICAL FIELD

The present disclosure relates to the technology field of multimedia and, more particularly, watermark processing methods and devices.

BACKGROUND

Transmission of multimedia content on the Internet is vulnerable to unlicensed broadcasting and hot-linking of multimedia data. In order to prevent unlicensed broadcasting and hot-linking, each platform owning a copyright of multimedia content needs to add a watermark to the multimedia content to identify ownership over the copyright of the multimedia content. For instance, a watermark is added in a video.

However, the existence of a watermark affects the viewing experience of the audience. A watermark processing method that not only may avoid affecting the viewing experience of the audience but also may effectively prevent unlicensed broadcasting and hot-linking needs to be provided.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides watermark processing methods and apparatuses that prevent unlicensed broadcasting and hotlinking through a watermark and meanwhile do not display the watermark during broadcasting to avoid affecting watch experience of audience.

According to one aspect of the present disclosure, a watermark processing method is provided and used in a server and comprises:

generating watermark parameters for original multimedia data;

performing watermark superposition processing on the original multimedia data according to the watermark parameters to obtain first multimedia data;

encoding the first multimedia data to obtain a first multimedia code stream and encapsulating the watermark parameters into the first multimedia code stream to obtain a second multimedia code stream; and sending the second multimedia code stream to a terminal device so that the terminal device performs watermark inverse superposition processing on the first multimedia data according to the watermark parameters to obtain original multimedia data;

Here, the inverse superposition processing is an inverse process of performing watermark superposition processing on the original multimedia data.

In an example implementation, the watermark parameters include watermark logo, watermark position, watermark size and watermark transparency, performing watermark superposition processing on the original multimedia data according to the watermark parameters to obtain first multimedia data comprises:

adjusting a size of a watermark image to which the watermark logo corresponds according to the watermark size to obtain a first watermark image; and determining a to-be-adjusted area of each image in the original multimedia data according to the watermark position and the watermark size, and adjusting values of pixels in the to-be-adjusted area of the image according to the watermark transparency and the first watermark image to obtain first multimedia data.

In an example implementation, adjusting values of pixels in the to-be-adjusted area of the image according to the watermark transparency and the first watermark image comprises:

determining a first ratio and a second ratio according to the watermark transparency;

determining signal components to which each pixel in the to-be-adjusted area of the image corresponds;

determining signal components to which each pixel in the first watermark image corresponds; the signal components comprise: a luminance signal component Y, a first chrominance signal component U and a second chrominance signal component V;

determining a first signal component of signal components of each pixel in the to-be-adjusted area according to the first ratio and the signal components of the pixel;

determining a second signal component of signal components of each pixel in the first watermark image according to the second ratio and the signal components of the pixel; and determining a sum of a first signal component of signal components of a respective pixel in the to-be-adjusted area and a second signal component of signal components of a pixel in the first watermark image corresponding to the respective pixel as a signal component of the respective pixel after adjustment.

In an example implementation, generating watermark parameters for original multimedia data comprises:

determining reference values of watermark parameters generating adjustment parameters; and adjusting the reference values of the watermark parameters according to the adjustment parameters to obtain the watermark parameters.

According to another aspect of the present disclosure, a watermark processing method is provided and used in a terminal device and comprises:

receiving a multimedia code stream to obtain watermark parameters carried in the multimedia code stream;

removing the watermark parameters in the multimedia code stream to obtain a first multimedia code stream;

decoding the first multimedia code stream to obtain first multimedia data; and performing watermark inverse superposition processing on the first multimedia data according to the watermark parameters to obtain original multimedia data;

Here, the inverse superposition processing is an inverse process of performing watermark superposition processing on the original multimedia data.

In an example implementation, the watermark parameters include watermark logo, watermark position, watermark size and watermark transparency, and performing watermark inverse superposition processing on the first multimedia data according to the watermark parameters comprises:

obtaining a watermark image to which the watermark logo corresponds;

adjusting a size of the watermark image according to the watermark size to obtain a first watermark image; and determining a to-be-adjusted area of each image in the first multimedia data according to the watermark position and the watermark size, and adjusting values of pixels in the to-be-adjusted area of the image according to the watermark transparency and the first watermark image.

In an example implementation, adjusting values of pixels in the to-be-adjusted area of the image according to the watermark transparency and the first watermark image comprises:

determining a third ratio and a fourth ratio according to the watermark transparency;

determining signal components to which each pixel in the to-be-adjusted area of the image corresponds;

determining signal components to which each pixel in the first watermark image corresponds, the signal components comprising a luminance signal component Y, a first chrominance signal component U and a second chrominance signal component V;

determining a first signal component of signal components of each pixel in the to-be-adjusted area according to the third ratio and the signal components of the pixel;

determining a second signal component of signal components of each pixel in the first watermark image according to the fourth ratio and the signal components of the pixel; and determining a difference between a first signal component of signal components of a respective pixel in the to-be-adjusted area and a second signal component of signal components of a pixel in the first watermark image corresponding to the respective pixel as a signal component of the respective pixel after adjustment.

According to another aspect of the present disclosure, a watermark processing apparatus is provided and used in a server and comprises:

a generation module, for generating watermark parameters for original multimedia data;

an overlapping module, for performing watermark superposition processing on the original multimedia data according to the watermark parameters to obtain first multimedia data;

a coding module, for encoding the first multimedia data to obtain a first multimedia code stream and encapsulating the watermark parameters into the first multimedia code stream to obtain a second multimedia code stream; and a sending module, for sending the second multimedia code stream to a terminal device so that the terminal device performs watermark inverse superposition processing on the first multimedia data according to the watermark parameters to obtain original multimedia data;

Here, the inverse superposition processing is an inverse process of performing watermark superposition processing on the original multimedia data.

In an example implementation, the watermark parameters include watermark logo, watermark position, watermark size and watermark transparency, and the superposition module comprises:

a first adjustment sub-module, for adjusting a size of a watermark image to which the watermark logo corresponds according to the watermark size to obtain a first watermark image; and a second adjustment sub-module, for determining a to-be-adjusted area of each image in the original multimedia data according to the watermark position and the watermark size, and adjusting values of pixels in the to-be-adjusted area of the image according to the watermark transparency and the first watermark image to obtain first multimedia data.

In an example implementation, the second adjustment sub-module comprises:

a first determination unit, for determining a first ratio and a second ratio according to the watermark transparency;

a second determination unit, for determining signal components to which each pixel in the to-be-adjusted area of the image corresponds;

a third determination unit, for determining signal components to which each pixel in the first watermark image corresponds; here, the signal components comprise: a luminance signal component Y, a first chrominance signal component U and a second chrominance signal component V;

a fourth determination unit, for determining a first signal component of signal components of each pixel in the to-be-adjusted area according to the first ratio and the signal components of the pixel;

a fifth determination unit, for determining a second signal component of signal components of each pixel in the first watermark image according to the second ratio and the signal components of the pixel; and a sixth determination unit, for determining a sum of a first signal component of signal components of a respective pixel in the to-be-adjusted area and a second signal component of signal components of a pixel in the first watermark image corresponding to the respective pixel as a signal component of the respective pixel after adjustment.

In an example implementation, the generation module comprises:

a first determination sub-module, for determining reference values of watermark parameters;

a generation sub-module, for generating adjustment parameters; and a third adjustment sub-module, for adjusting the reference values of the watermark parameters according to the adjustment parameters to obtain the watermark parameters.

According to another aspect of the present disclosure, a watermark processing apparatus is provided and used in a terminal device and comprises:

a receiving module, for receiving a multimedia code stream to obtain watermark parameters carried in the multimedia code stream;

a removing module, for removing the watermark parameters in the multimedia code stream to obtain a first multimedia code stream;

a decoding module, for decoding the first multimedia code stream to obtain first multimedia data; and an inverse superposition module, for performing watermark inverse superposition processing on the first multimedia data according to the watermark parameters to obtain original multimedia data;

Here, the inverse superposition processing is an inverse process of performing watermark superposition processing on the original multimedia data.

In an example implementation, the watermark parameters include watermark logo, watermark position, watermark size and watermark transparency, and the inverse superposition module comprises:

an obtaining sub-module, for obtaining a watermark image to which the watermark logo corresponds;

a fourth adjustment sub-module, for adjusting a size of the watermark image according to the watermark size to obtain a first watermark image; and a fifth adjustment sub-module, for determining a to-be-adjusted area of each image in the first multimedia data according to the watermark position and the watermark size, and adjusting values of pixels in the to-be-adjusted area of the image according to the watermark transparency and the first watermark image.

In an example implementation, the fifth adjustment sub-module comprises:

a seventh determination unit, for determining a third ratio and a fourth ratio according to the watermark transparency;

an eighth determination unit, for determining signal components to which each pixel in the to-be-adjusted area of the image corresponds;

a ninth determination unit, for determining signal components to which each pixel in the first watermark image corresponds; here, the signal components comprise: a luminance signal component Y, a first chrominance signal component U and a second chrominance signal component V;

a tenth determination unit, for determining a first signal component of signal components of each pixel in the to-be-adjusted area according to the third ratio and the signal components of the pixel;

an eleventh determination unit, for determining a second signal component of signal components of each pixel in the first watermark image according to the fourth ratio and the signal components of the pixel; and a twelfth determination unit, for determining a difference between a first signal component of signal components of a respective pixel in the to-be-adjusted area and a second signal component of signal components of a pixel in the first watermark image corresponding to the respective pixel as a signal component of the respective pixel after adjustment.

According to another aspect of the present disclosure, a watermark processing apparatus is provided and comprises: one or more processors; and memory storing computer-readable instructions executable by the one or more processors that, when executed by the one or more processors, cause the one or more processors to execute the foregoing methods.

According to another aspect of the present disclosure, memory storing computer-readable instructions executable by the one or more processors is provided, that when executed by the one or more processors, cause the one or more processors to execute the foregoing methods. For example, the memory is a non-volatile computer readable memory medium.

The server obtains first multimedia data through generating watermark parameters and overlapping a watermark on the original multimedia data according to the watermark parameters, encapsulates the foregoing watermark parameters into a first multimedia code stream to which the first multimedia data corresponds after encoding the foregoing first multimedia data to obtain a second multimedia code stream, and sends the second multimedia code stream to a terminal device.

As the second multimedia code stream is multimedia content overlapped with a watermark, when unlicensed broadcasting or hotlinking occurs, multimedia content played on an unlicensed broadcasting or hotlinking platform contains the watermark. This may protect the copyright interest of the platform owing the multimedia content, while when a user of the platform owing the multimedia content receives the foregoing multimedia content played through a terminal device, as the foregoing second multimedia code stream carries watermark parameters, the terminal device inversely overlaps the watermark according to the foregoing watermark parameters to obtain multimedia content without the watermark. The watermark processing method and apparatus according to example embodiments of the present disclosure prevent unlicensed broadcasting and hotlinking through a watermark and meanwhile do not display the watermark during broadcasting to avoid affecting watch experience of audience.

The example embodiments are described in detail with reference to accompanying drawings below, from which other features and aspects of the present disclosure will be evident.

BRIEF DESCRIPTION OF DRAWINGS

The accompanying drawings described herein are used to enable further understanding of the present disclosure and constitute a part of the present disclosure. Example embodiments of the present disclosure are used to explain the present disclosure, and do not improperly limit the present disclosure. In the drawings.

DETAILED DESCRIPTION

The example embodiments, features and aspects of the present disclosure will be described in detail with reference to the accompanying drawings below. In the accompanying drawings, the same reference sign stands for an element with the same or similar function. Although the accompanying drawings show various aspects of example embodiments, it is not necessary to draw the accompanying drawings in proportion unless particularly stated.

Here, special term "exemplary" means "used as an example or an example embodiment, or illustrative". Here, it is not necessarily to explain any "exemplary" example embodiment to be superior to or better than other example embodiments.

Further, in order to better describe the present disclosure, more details are given in the following example embodiments. In some examples, methods, means, elements and circuits well known to those skilled in the art are not described in detail to highlight the subject of the present disclosure.

Figure 1:
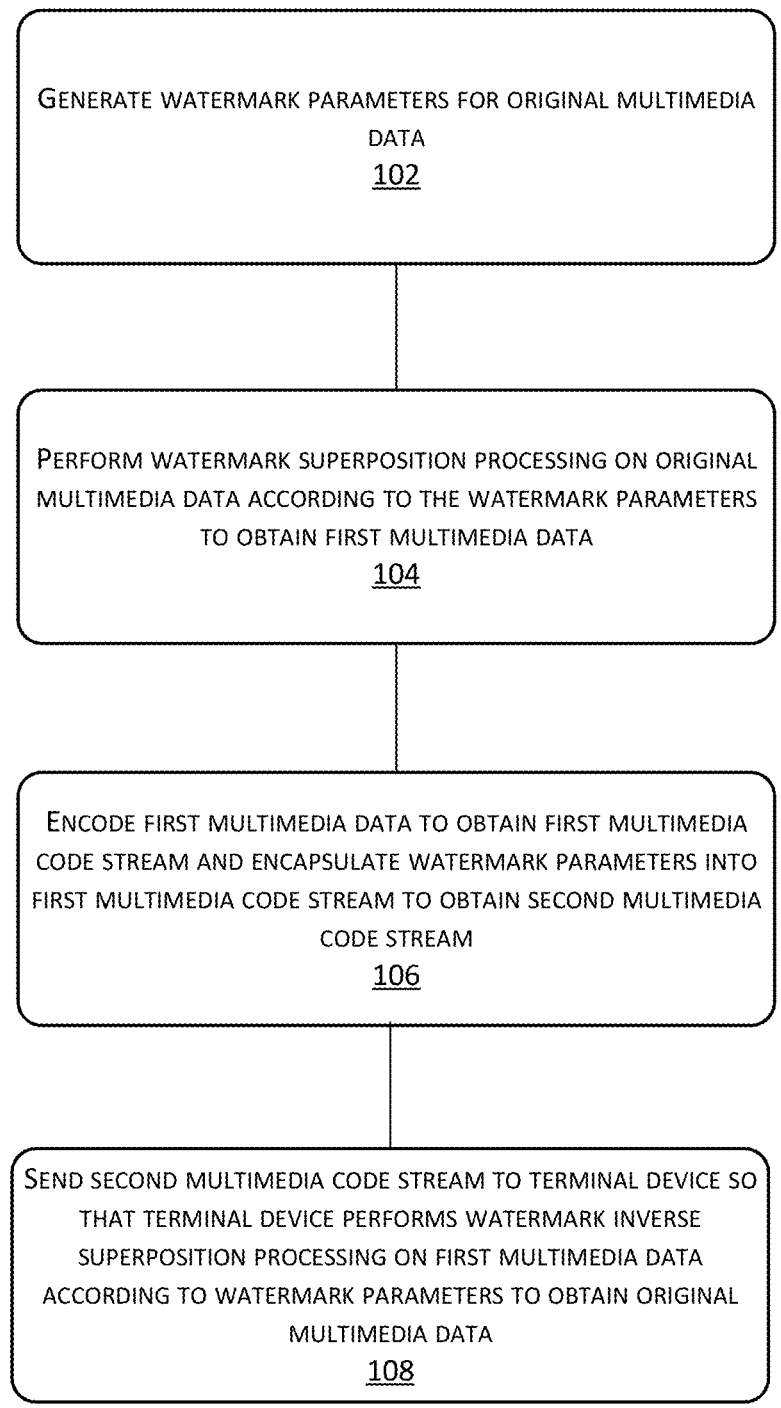
FIG. 1 shows a flow chart of a watermark processing method according to an example embodiment of the present disclosure.

FIG. 1 shows a flow chart of a watermark processing method according to an example embodiment of the present disclosure. The method may be used in a server. As shown in FIG. 1, the method may comprise:

Step 102, generating watermark parameters for original multimedia data.

The foregoing watermark parameters may be relevant parameters of a watermark that is about to be overlapped into original multimedia data. For example, the foregoing watermark parameters may include one or more of following parameters: watermark pattern, watermark position, watermark size, watermark transparency, etc.

The foregoing watermark parameters may be parameters generated according to setting operation of a user. For example, a terminal device may respond to the user's setting operation of the watermark parameters (input parameters through a command line, or through an input box or by other methods), obtain the foregoing set parameters (such as watermark logo, watermark position, watermark size and watermark transparency) and upload the foregoing parameters to a server. The server may generate watermark parameters according to the foregoing parameters; alternatively, the foregoing watermark parameters may be stored on a server in advance, and the server may obtain the foregoing watermark parameters directly from a storage area of the foregoing watermark parameters. The present disclosure sets no limitation to generation methods of watermark parameters.

Step 104, performing watermark superposition processing on the original multimedia data according to the watermark parameters to obtain first multimedia data.

As described above, watermark parameters may include: watermark logo, watermark position, watermark size, etc. A server may determine a corresponding watermark image according to the watermark logo, and may adjust a size of the watermark image according to the watermark size, and overlap the foregoing adjusted watermark image into an area to which the foregoing watermark position corresponds in original multimedia data; alternatively, the foregoing watermark parameters may further include: watermark transparency, and the server may overlap the adjusted watermark image into an area to which the foregoing watermark position corresponds in original multimedia data according to the watermark transparency to obtain first multimedia data.

It should be noted that the above are just a few examples of overlapping a watermark on the original multimedia data according to watermark parameters, and alternatively, relevant methods in current technologies may be employed to overlap a watermark for multimedia data according to watermark parameters. The present disclosure sets no limitation to it.

Step 106, encoding the first multimedia data to obtain a first multimedia code stream and encapsulating the watermark parameters into the first multimedia code stream to obtain a second multimedia code stream.

A server may code the foregoing first multimedia data. For example, the coding may employ H.264, AVS (Audio Video coding Standard), VP9 (Next Gen Open Video) or other methods. The present disclosure sets no limitation to coding methods.

After the coding is completed, the server may encapsulate the foregoing watermark parameters into the foregoing first multimedia code stream to obtain a second multimedia code stream. For example, the server may encapsulate the foregoing watermark parameters into an extended field used to encapsulate user-defined data in the foregoing first multimedia code stream.

In an example, a server may employ H.264 to code the foregoing first multimedia data. As an extended field of user-defined data of H.264 is encapsulated in SEI (Supplemental enhancement information) data, the server may encapsulate the foregoing watermark parameters into the extended field of the user-defined data in the SEI data. This SEI data appears in front of a header of every frame I or frame IDR.

Step 108, sending the second multimedia code stream to a terminal device so that the terminal device performs watermark inverse superposition processing on the first multimedia data according to the watermark parameters to obtain original multimedia data.

Here, the inverse superposition processing is an inverse process of performing watermark superposition processing on the original multimedia data.

A server may transmit the foregoing second multimedia code stream to a terminal device via the Internet.

In this way, the server obtains first multimedia data through generating watermark parameters and overlapping a watermark on the original multimedia data according to the watermark parameters, encapsulates the foregoing watermark parameters into a first multimedia code stream to which the first multimedia data corresponds after coding for the foregoing first multimedia data to obtain a second multimedia code stream, and sends the second multimedia code stream to a terminal device.

As the second multimedia code stream is multimedia content overlapped with a watermark, when unlicensed broadcasting or hotlinking occurs, multimedia content broadcast on an unlicensed broadcasting or hotlinking platform contains the watermark. This may protect the copyright interest of the platform owing the multimedia content, while when a user of the platform owing the multimedia content receives and broadcasts the foregoing multimedia content through a terminal device, as the foregoing second multimedia code stream carries watermark parameters, the terminal device may inversely overlap the watermark according to the foregoing watermark parameters to obtain multimedia content without the watermark. The watermark processing method and apparatus according to example embodiments of the present disclosure may prevent unlicensed broadcasting and hotlinking through a watermark and meanwhile does not display the watermark during broadcasting to avoid affecting watch experience of audience.

Figure 2:
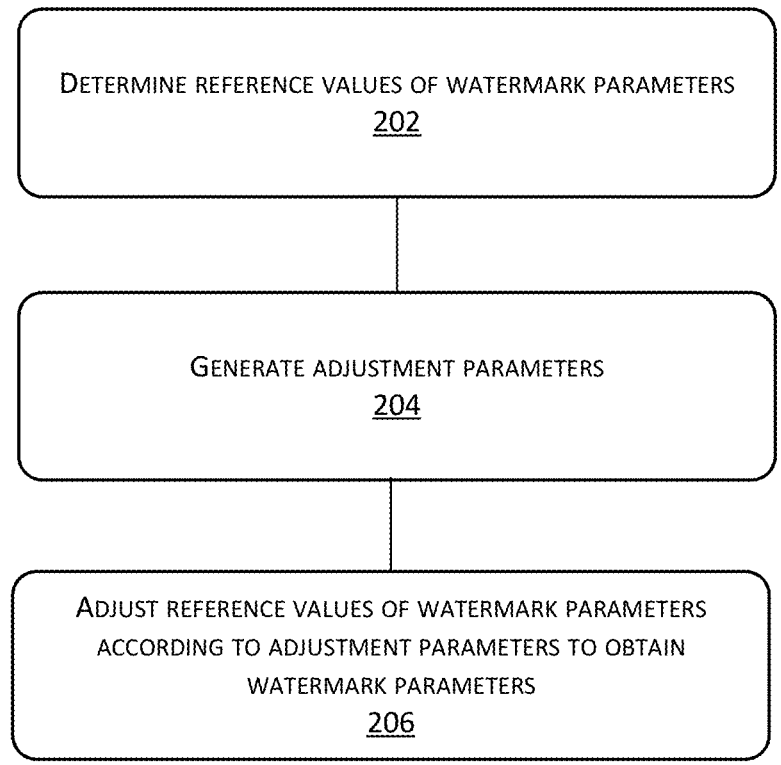
FIG. 2 shows a flow chart of a step 102 method according to an example embodiment of the present disclosure.

FIG. 2 shows a flow chart of a step 102 method according to an example embodiment of the present disclosure.

In an example implementation, as shown in FIG. 2, the foregoing step 102, generating watermark parameters for original multimedia data comprises following steps:

Step 202, determining reference values of watermark parameters.

The foregoing reference values of watermark parameters may be initial values used to obtain the watermark parameters. By adjusting the foregoing reference values of watermark parameters, a server may obtain the watermark parameters. The foregoing reference values of watermark parameters may be initial values of watermark parameters that are set and uploaded to a server by a user via a terminal device or pre-stored in a server. The server may determine all or some of parameters that need to be adjusted among the foregoing initial values of watermark parameters as reference values of watermark parameters. For example, the foregoing initial values of watermark parameters may include: a watermark logo value, a watermark position value, a watermark size value, a watermark transparency value, etc., and the server may determine one or more foregoing initial values of watermark parameters as reference values of watermark parameters, for example: determine a watermark logo value as a reference value of watermark logo, a watermark position value as a reference value of watermark logo, a watermark size value as a reference value of watermark size, and a watermark transparency value as a reference value of watermark transparency.

Step 204, generating adjustment parameters.

The foregoing adjustment parameters may be values used to adjust reference values of watermark parameters. For example, an adjustment parameter to which the foregoing reference value of watermark logo corresponds may be a watermark logo, and a watermark image identified by the watermark logo and a watermark image identified by the foregoing reference value of watermark logo may pertain to a same category (for example: identify a watermark to which a same video content pertains). For example, a server may, according to the foregoing reference value of watermark logo, determine a watermark category of the corresponding watermark, and randomly determine a watermark logo from watermark logos corresponding to the foregoing watermark category as an adjustment parameter;

An adjustment parameter to which the foregoing reference value of watermark transparency corresponds may be a value randomly determined in a first threshold range. For example, if the foregoing first threshold range is 30%~50%, then it may be determined that a random number in the foregoing range of 30%~50% is an adjustment parameter. The foregoing first threshold range may be a range of values determined by those skilled in the art according to watermark adjustment need. The present disclosure sets no limitation to it.

Adjustment parameters to which the foregoing reference value of a watermark position and a reference value of a watermark size correspond may be a random number in a second threshold range. The foregoing second threshold range may be a range of values determined by those skilled in the art according to watermark adjustment need. The present disclosure sets no limitation to it.

For example, adjustment parameters of a reference value of a watermark position and a reference value of watermark size may correspond to a same threshold range. For example, a second threshold range may be 1~20, and a server may generate a random number in a range of 1~20 and determine the random number as an adjustment parameter; alternatively, a server may generate a plurality of random numbers in a range of 1~20 and respectively determine that the foregoing random numbers are adjustment parameters to which a reference value of a watermark position and a reference value of watermark size correspond.

In fact, the foregoing adjustment parameters to which a reference value of a watermark position and a reference value of a watermark size correspond may further be random numbers in different threshold ranges. The present disclosure sets no limitation to it.

Step 206, adjusting the reference values of the watermark parameters according to the adjustment parameters to obtain the watermark parameters.

A server may adjust corresponding reference values of watermark parameters according to adjustment parameters to obtain the watermark parameters. For example, reference values of a watermark include: a reference value of a watermark logo, a reference value of a watermark position, a reference value of a watermark size and a reference value of watermark transparency. The server may determine an adjustment parameter to which the foregoing reference value of a watermark logo corresponds as a watermark logo, and an adjustment parameter to which the foregoing reference value of watermark transparency corresponds as watermark transparency.

A server may adjust a reference value of a watermark position according to an adjustment parameter to which the reference value of the watermark position corresponds, may make adjustment according to an adjustment parameter to which a reference value of a watermark size corresponds as well as a reference value of a watermark size to obtain the watermark position and the watermark size, and may generate watermark parameters according to the foregoing watermark logo, watermark transparency, watermark position and watermark size.

For example, based on adjustment of a reference value of a watermark position and a reference value of a watermark size, a server may determine a sum of the foregoing reference values of watermark parameters (a reference value of a watermark position and a reference value of a watermark size) and corresponding adjustment parameters as corresponding watermark parameters. Example: a reference value of a watermark position may include a reference value of an x-axis position of the watermark and a reference value of a y-axis position of the watermark, a reference value of a watermark size may include a reference value of total horizontal length of the watermark and a reference value of total vertical height of the watermark, and the reference values of the watermark parameters may be adjusted with reference to Formula I:

$$X = X\_reference + random\ (0,20)$$

$$Y = Y\_reference + random\ (0,20)$$

$$length = length\_reference + random\ (0,20)$$

$$height = height\_reference + random\ (0,20) \qquad \text{Formula I}$$

Where, the foregoing x may denote an x-axis position of the watermark, y may denote a y-axis position of the watermark, length may denote a length of the watermark, height may denote a height of the watermark, X_reference may denote a reference value of an x-axis position of the watermark, y_reference may denote a reference value of a y-axis position of the watermark, length_reference may denote a reference value of a length of the watermark, height_reference may denote a reference value of a height of the watermark, and the foregoing random (0,20) may denote a random number in a range of 0~20.

After the server determines the foregoing x-axis position, y-axis position, length and height of the watermark, the server may generate watermark parameters according to the watermark logo, watermark transparency, x-axis position, y-axis position, length and height of the watermark.

In another example, based on adjustment of a reference value of a watermark position and a reference value of a watermark size, a server may further determine a difference between the foregoing reference values of watermark parameters (a reference value of a watermark position and a reference value of a watermark size) and the foregoing adjustment parameters as corresponding watermark parameters. The present disclosure sets no limitation to methods of a server for adjusting the foregoing reference values of watermark parameters according to adjustment parameters.

Figure 3:
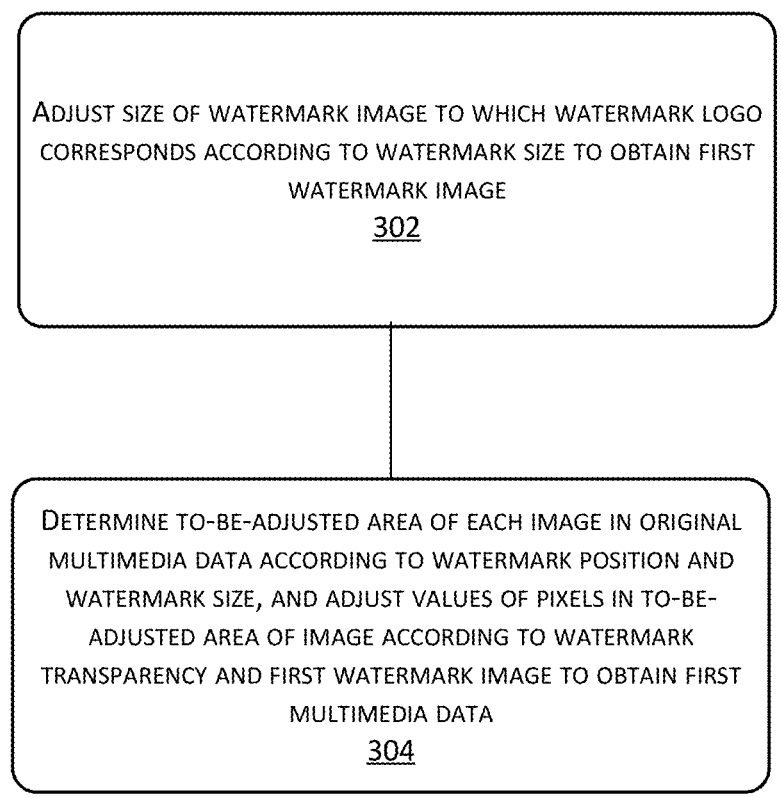
FIG. 3 shows a flow chart of a step 104 method according to an example embodiment of the present disclosure.

FIG. 3 shows a flow chart of a step 104 method according to an example embodiment of the present disclosure.

In an example implementation, the foregoing watermark parameters may include watermark logo, watermark position, watermark size and watermark transparency, as shown in FIG. 3. The foregoing step 104, performing watermark superposition processing on the original multimedia data according to the watermark parameters to obtain first multimedia data may comprise the following steps:

Step 302, adjusting a size of a watermark image to which the watermark logo corresponds according to the watermark size to obtain a first watermark image.

A server may obtain a corresponding watermark image according to a storage area of the foregoing watermark logo in the watermark image, and may conduct stretching, scaling and/or other operations of the foregoing watermark image according to the foregoing watermark size to adjust a size of the foregoing watermark image and obtain a first watermark image so that the size of the foregoing first watermark image is consistent with the foregoing watermark size. Example: The foregoing watermark size may comprise a length of the watermark and a height of the watermark. Through stretching, scaling and/or other operations of the foregoing watermark image, the length of the foregoing first watermark image is consistent with the watermark length in the foregoing watermark size, and the height of the foregoing first watermark image is consistent with the watermark height in the foregoing watermark size.

It should be noted that the foregoing stretching, scaling and/or other operations of the foregoing watermark image may be achieved through any relevant image scaling algorithm, such as bicubic algorithm, nearest-neighbor interpolation algorithm, quadratic linear interpolation algorithm or cubic convolution interpolation algorithm. The present disclosure sets no limitation to it.

Step 304, determining a to-be-adjusted area of each image in the original multimedia data according to the watermark position and the watermark size, and adjusting values of pixels in the to-be-adjusted area of the image according to the watermark transparency and the first watermark image to obtain first multimedia data.

For example, the foregoing watermark position may denote an overlapping position of a watermark image on original multimedia data. For example, the foregoing watermark position may denote coordinate values of a top left corner of the foregoing watermark image in an image of the original multimedia data. The coordinate values may choose the top left corner of the foregoing image as (0,0) point. A server may determine a position of a first watermark image in an image of the original multimedia data according to the coordinate values. A watermark size may, as described above, comprise a length and a height of the watermark image. Therefore, a server may determine a to-be-adjusted area of original multimedia data according to a watermark position and a watermark size.

Figure 4:
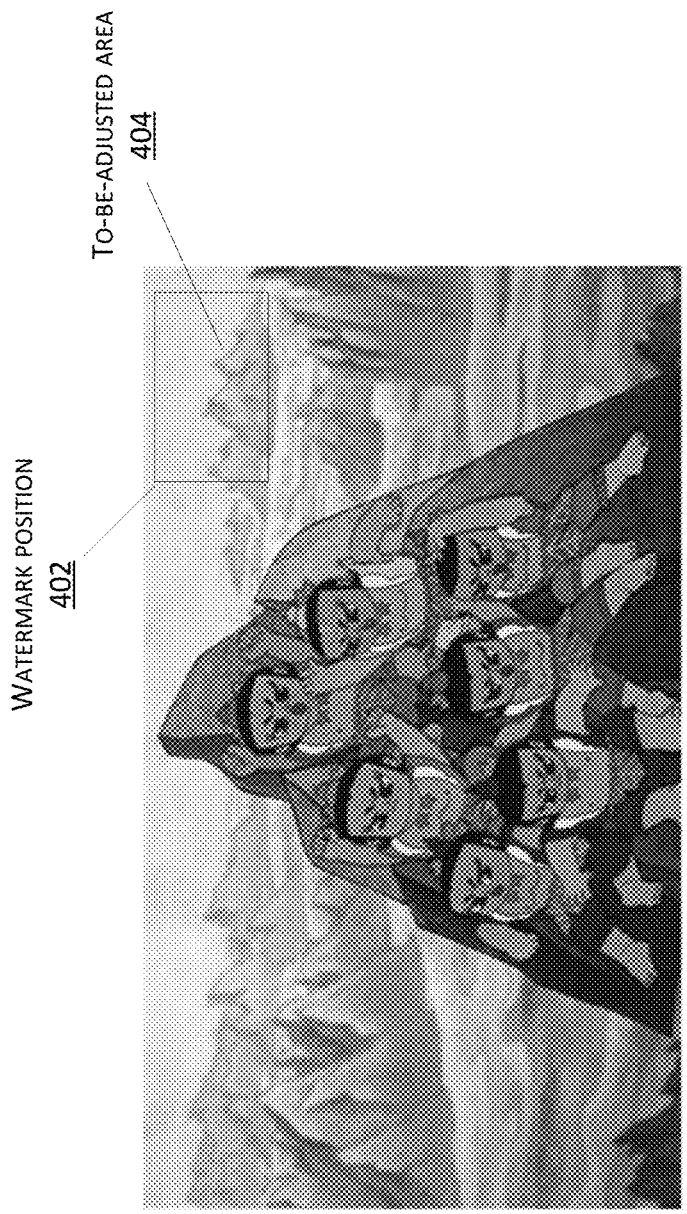
FIG. 4 shows a schematic diagram of an image in first multimedia data in an example of the present disclosure.

FIG. 4 shows a schematic diagram of an image in first multimedia data in an example of the present disclosure.

In fact, when the foregoing watermark image is square, the foregoing watermark position 402 may further be a coordinate of any of four angles of the watermark image, or alternatively, coordinates of the four angles of the watermark image may be used to express the watermark position and the watermark size; or when the foregoing watermark image is round, the foregoing watermark position may be a coordinate of a center of a circle, and the watermark size may be a radius of the circle. The present disclosure sets no limitation to the foregoing watermark position.

A server may adjust pixel values in the foregoing to-be-adjusted area 404. For example, pixel values in the foregoing to-be-adjusted area 404 and pixel values of a first watermark image may be adjusted according to the foregoing watermark transparency. Based on the adjusted to-be-adjusted area 404 and the first watermark image, the pixels of the first watermark image are overlapped on pixels of the adjusted to-be-adjusted area to obtain first multimedia data.

Figure 5:
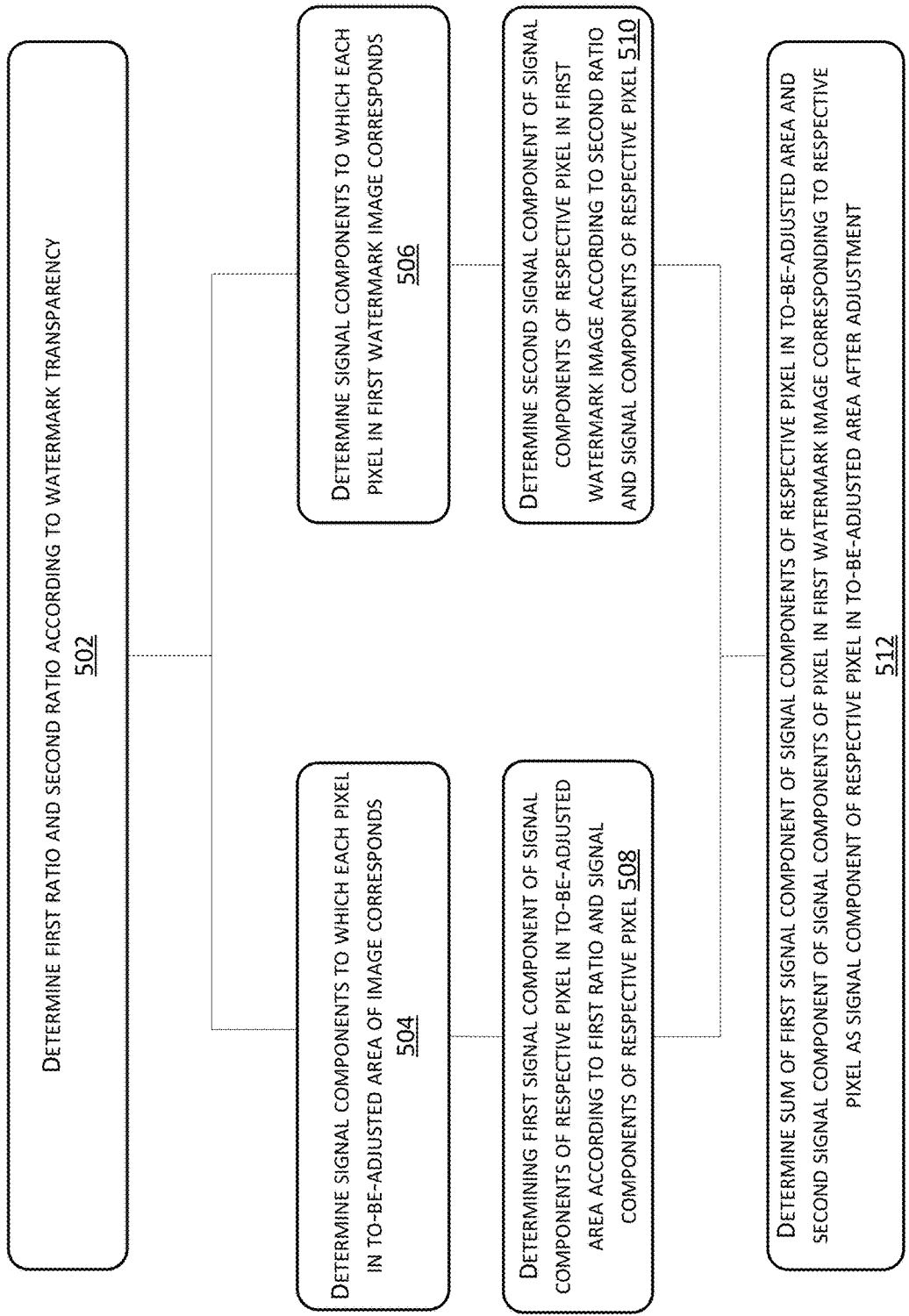
FIG. 5 shows a flow chart of a watermark processing method according to an example embodiment of the present disclosure.

FIG. 5 shows a flow chart of a watermark processing method according to an example embodiment of the present disclosure.

In an example implementation, as shown in FIG. 5, adjusting values of pixels in the to-be-adjusted area of the image according to the watermark transparency and the first watermark image may comprise following steps:

Step 502, determining a first ratio and a second ratio according to the watermark transparency.

For example, a server may determine the foregoing watermark transparency as the first ratio, and may determine a difference between 1 and the foregoing watermark transparency as the second ratio, or may determine a difference between 1 and the foregoing watermark transparency as the first ratio, and the foregoing watermark transparency as the second ratio.

In fact, it is feasible to determine a first ratio and a second ratio according to the watermark transparency. The present disclosure sets no limitation to methods for determining the foregoing first ratio and second ratio.

Step 504, determining signal components to which each pixel in the to-be-adjusted area of the image corresponds.

Step 506, determining signal components to which each pixel in the first watermark image corresponds.

Here, the signal components comprise: a luminance signal component Y, a first chrominance signal component U and a second chrominance signal component V;

A server may determine a luminance signal component Y, a first chrominance signal component U and a second chrominance signal component V to which each pixel in the foregoing to-be-adjusted area corresponds; and may determine a luminance signal component Y, a first chrominance signal component U and a second chrominance signal component V to which each pixel in the foregoing first watermark image corresponds.

Step 508, determining a first signal component of signal components of a respective pixel in the to-be-adjusted area according to the first ratio and the signal components of the respective pixel.

A server may determine a luminance signal component Y, a first chrominance signal component U and a second chrominance signal component V of each pixel in a to-be-adjusted area and may determine, according to the foregoing first ratio, first signal components to which the luminance signal component Y, the first chrominance signal component U and the second chrominance signal component V of each pixel correspond respectively. For example, the first signal components of each pixel in the to-be-adjusted area may comprise a luminance signal component Y1, a first chrominance signal component U1 and a second chrominance signal component V1.

In an example, a product of the foregoing first ratio and signal components of pixels in the foregoing to-be-adjusted area may be determined to be the foregoing first signal components.

Step 510, determining a second signal component of signal components of a respective pixel in the first watermark image according to the second ratio and the signal components of the respective pixel.

A server may determine a luminance signal component Y, a first chrominance signal component U and a second chrominance signal component V of each pixel in a first watermark image, and may determine, according to the foregoing first ratio, second signal components to which the luminance signal component Y, the first chrominance signal component U and the second chrominance signal component V of each pixel correspond respectively. For example, the second signal components of each pixel in the first watermark image may comprise a luminance signal component Y2, a first chrominance signal component U2 and a second chrominance signal component V2.

In an example, a product of the foregoing second ratio and signal components of pixels in the foregoing first watermark image may be determined to be the foregoing second signal components.

Step 512, determining a sum of a first signal component of signal components of the respective pixel in the to-be-adjusted area and a second signal component of signal components of a pixel in the first watermark image corresponding to the respective pixel as a signal component of the respective pixel in the to-be-adjusted area after adjustment.

For each pixel in a to-be-adjusted area of the foregoing original multimedia data, a server may determine a sum of a first signal component to which a luminance signal component Y of the pixel corresponds and a second signal component to which a luminance signal component Y of a pixel corresponding to this pixel in the foregoing first watermark image corresponds as an adjusted luminance signal component Y of this pixel; the server may determine a sum of a first signal component to which a first chrominance signal component U of the pixel corresponds and a second signal component to which a first chrominance signal component U of a pixel corresponding to this pixel in the foregoing first image corresponds as an adjusted first chrominance signal component U of this pixel; the server may determine a sum of a first signal component to which a second chrominance signal component V of the pixel corresponds and a second signal component to which a second chrominance signal component V of a pixel corresponding to this pixel in the foregoing first image corresponds as an adjusted second chrominance signal component V of this pixel; the server may determine multimedia data obtained after adjusting the to-be-adjusted area of the foregoing original multimedia data as first multimedia data.

For example, a server may determine adjustment of every pixel in a to-be-adjusted area according to Formula II:

$$Y = \text{alpha} \times Y\_\text{video} + (1-\text{alpha}) \times Y\_\text{watermark}$$

$$U = \text{alpha} \times U\_\text{video} + (1-\text{alpha}) \times U\_\text{watermark}$$

$$V = \text{alpha} \times V\_\text{video} + (1-\text{alpha}) \times V\_\text{watermark} \qquad \text{Formula II}$$

Where, the foregoing Y_video may denote a luminance signal component Y of each pixel in a to-be-adjusted area of original multimedia data; U_video may denote a first chrominance signal component U of each pixel in a to-be-adjusted area of original multimedia data; V_video may denote a second chrominance signal component V of each pixel in a to-be-adjusted area of original multimedia data; Y_watermark may denote a luminance signal component Y of each pixel in a first watermark image; U_watermark may denote a first chrominance signal component U of each pixel in a first watermark image; V_watermark may denote a second chrominance signal component V of each pixel in a first watermark image;

alpha may denote a first ratio (watermark transparency), and (1-alpha) may denote a second ratio; Y may denote a luminance signal component Y of each pixel in a to-be-adjusted area of original multimedia data after adjustment, U may denote a first chrominance signal component U of each pixel in a to-be-adjusted area of original multimedia data after adjustment, and V may denote a second chrominance signal component V of each pixel in a to-be-adjusted area of original multimedia data after adjustment.

Further, the foregoing watermark image may be in a standard image file format, such as: bmp, jpg or png, and may also be an uncompressed image in a YUV format. For a watermark image in a standard image file format, a server may convert the watermark image from an RGB color space into a YUV color space after the foregoing watermark image is decoded. The conversion method may refer to international standard BT.709 and other relevant regulations.

Figure 6:
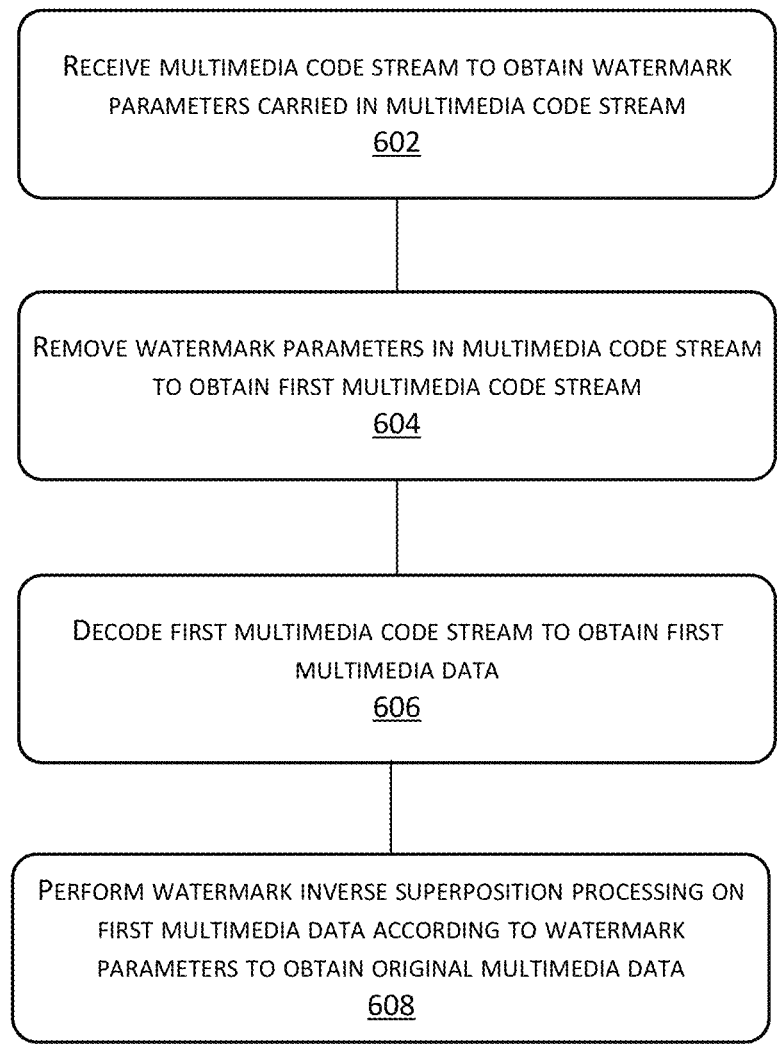
FIG. 6 shows a flow chart of a watermark processing method according to an example embodiment of the present disclosure.

FIG. 6 shows a flow chart of a watermark processing method according to an example embodiment of the present disclosure. This method may be used in a terminal device, such as: mobile phone, tablet computer, computer and other devices. As shown in FIG. 6, the method may comprise following steps:

Step 602, receiving a multimedia code stream to obtain watermark parameters carried in the multimedia code stream.

A terminal device may receive the foregoing multimedia code stream. In the multimedia code stream, watermark parameters may be carried. Here, the foregoing watermark parameters may be related parameters of a watermark overlapped with multimedia data to which the multimedia code stream corresponds. For example, the foregoing watermark parameters may comprise one or more of following parameters: watermark pattern, watermark position, watermark size, watermark transparency, etc.

Through an inverse process of the watermark parameter encapsulation process, a terminal device may obtain watermark parameters carried in the multimedia code stream.

For example, there is a preset shared agreement or protocol between the server and the terminal device with the valid license to display the original multimedia data (valid terminal device) to identify the watermark parameters. The server shares such agreement or protocol with the valid terminal device so that the server embeds the watermark parameters into the multimedia code stream in a preset form and only the valid terminal device is able to identify the watermark parameters. For instance, the watermark parameters are located in a preset data field, a preset location, or in a preset format only known between the server and the valid terminal device. Thus, the valid terminal device is able to remove the watermark at the step 604 and then display the original multimedia data.

As the terminal device without the valid license to display the original multimedia data (invalid terminal device) does not have such shared agreement or protocol with the server, the invalid terminal device is unable to identify the watermark parameters or distinguish the watermark parameters from the multimedia code stream even possessing the multimedia code stream. Thus, the invalid terminal device is unable to remove the watermark when displaying the multimedia code stream.

For example, if a server encapsulates the foregoing watermark parameters into SEI data through H.264 standard, the terminal device may parse an extended field of user-defined data in the SEI data so as to obtain the foregoing watermark parameters from the foregoing extended field of the user-defined data. The location of the extended field of user defined data may be only known to the server and the valid terminal device.

Alternatively, for another example, the server encrypts the watermark parameters in the multimedia code stream based on a preset encryption algorithm and only valid terminal device has the proper decryption key or decryption algorithm to decrypt to obtain the watermark parameters.

There are various methods to identify the watermark parameters from the multimedia code stream to which the present disclosure does not impose any limitation.

Step 604, removing the watermark parameters in the multimedia code stream to obtain a first multimedia code stream.

After the terminal device obtains the foregoing watermark parameters, the foregoing watermark parameters may be deleted from the foregoing multimedia code stream to obtain a first multimedia code stream. The first multimedia code stream is a code stream to which multimedia data overlapped with the watermark corresponds.

Step 606, decoding the first multimedia code stream to obtain first multimedia data.

A terminal device may decode the foregoing first multimedia code stream. The decoding method may correspond to a multimedia data coding method employed by the server. For example, H.264, AVS or VP9 may be employed for decoding.

Step 608, performing watermark inverse superposition processing on the first multimedia data according to the watermark parameters to obtain original multimedia data.

Here, the inverse superposition processing is an inverse process of performing watermark superposition processing on the original multimedia data.

A server may overlap a watermark for original multimedia data according to watermark parameters to obtain first multimedia data overlapped with the trademark. Accordingly, a terminal device may inversely overlap the watermark for the foregoing first multimedia data according to watermark parameters to remove the watermark overlapped in the first multimedia data and obtain the original multimedia data. For example, the foregoing watermark parameters may include: watermark logo, watermark position, watermark size, etc., and a server may determine a corresponding watermark image according to the watermark logo, may adjust a size of the watermark image according to the watermark size and overlap the foregoing adjusted watermark image to an area to which the foregoing watermark position in the original multimedia data corresponds, to obtain first multimedia data; a terminal device may determine a corresponding watermark image according to the watermark logo, may adjust a size of the watermark image according to the watermark size, and employ an inverse process of the foregoing watermark overlapping in an area to which the watermark position in the foregoing first multimedia data corresponds to remove the watermark in the foregoing first multimedia data.

Figure 7:
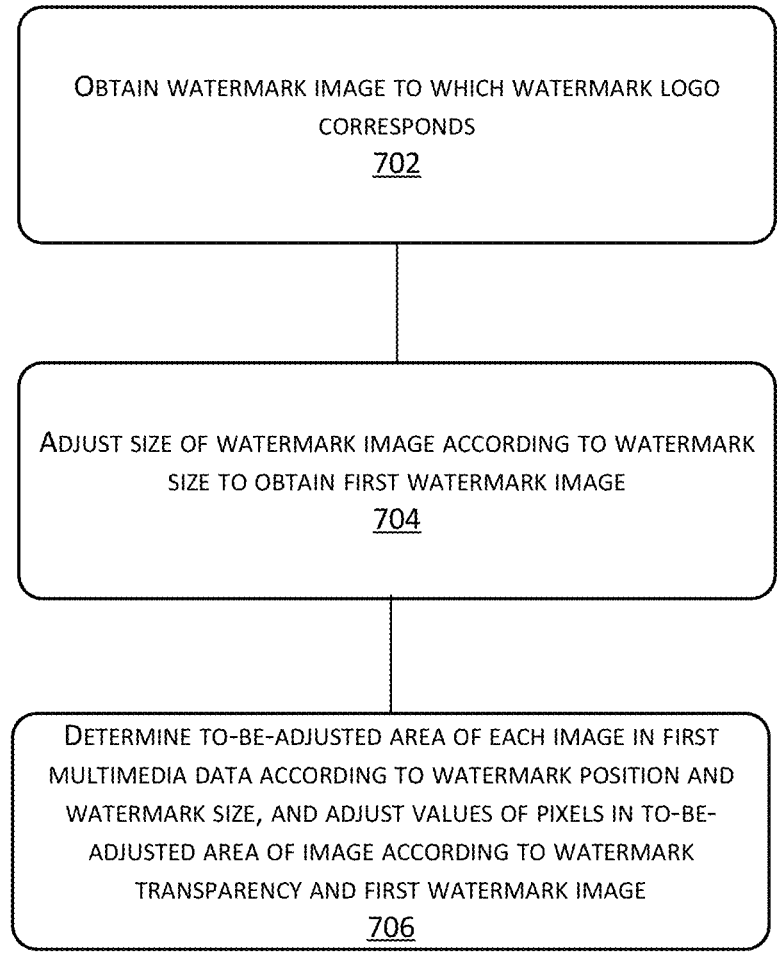
FIG. 7 shows a flow chart of a watermark processing method according to an example embodiment of the present disclosure.

FIG. 7 shows a flow chart of a step 608 method according to an example embodiment of the present disclosure.

In an example implementation, the watermark parameters include watermark logo, watermark position, watermark size and watermark transparency, as shown in FIG. 7, the foregoing step 608, performing watermark inverse superposition processing on the first multimedia data according to the watermark parameters may comprise following steps:

Step 702, obtaining a watermark image to which the watermark logo corresponds.

A terminal device may obtain a corresponding watermark image according to the watermark logo. For example, the terminal device may obtain a corresponding watermark image from a cache region of watermark images according to the watermark logo. If the foregoing cache region does not store the corresponding watermark image, the terminal device may file a request to a server according to the foregoing watermark logo to obtain the corresponding watermark image and may cache the foregoing watermark image to the foregoing cache region.

Step 704, adjusting a size of the watermark image according to the watermark size to obtain a first watermark image.

A terminal device may conduct stretching, scaling and/or other operations of the foregoing watermark image according to the foregoing watermark size to adjust a size of the foregoing watermark image and obtain a first watermark image so that the size of the foregoing first watermark image is consistent with the foregoing watermark size. Example: The foregoing watermark size comprises a length of the watermark and a height of the watermark. Through stretching, scaling and/or other operations of the foregoing watermark image, the length of the foregoing first watermark image is consistent with the length in the foregoing watermark size, and the height of the foregoing first watermark image is consistent with the height in the foregoing watermark size.

It should be noted that the foregoing stretching, scaling and/or other operations of the foregoing watermark image may be achieved through any relevant image scaling algorithm, such as bicubic algorithm, nearest-neighbor interpolation algorithm, quadratic linear interpolation algorithm and cubic convolution interpolation algorithm. The present disclosure sets no limitation to it.

Step 706, determining a to-be-adjusted area of each image in the first multimedia data according to the watermark position and the watermark size, and adjusting values of pixels in the to-be-adjusted area of the image according to the watermark transparency and the first watermark image.

The foregoing to-be-adjusted area may be an overlapping area of the foregoing first watermark image in the foregoing first multimedia data. For example, the foregoing watermark position may denote coordinate values of a top left corner of the foregoing watermark image in an image of the first multimedia data. The coordinate values may choose a top left corner of an image as (0,0) point. A terminal device may determine a position of a first watermark image in an image of the first multimedia data according to the coordinate values. The terminal device may determine an area of each image in first multimedia data, which is in the foregoing watermark position and is of the watermark size as a to-be-adjusted area.

In fact, when the foregoing watermark image is square, the foregoing watermark position may further be a coordinate of any of four angles of the watermark image, or alternatively, coordinates of the four angles of the watermark image may be used to express the watermark position and the watermark size; or when the foregoing watermark image is round, the foregoing watermark position may be a coordinate of a center of a circle, and the watermark size may be a radius of the circle. The present disclosure sets no limitation to the foregoing watermark position.

A terminal device may adjust pixel values in the foregoing to-be-adjusted area. For example, pixel values in the foregoing to-be-adjusted area and pixel values of a first watermark image may be adjusted according to the foregoing watermark transparency. Based on the adjusted to-be-adjusted area and the first watermark image, the pixel values of the first watermark image are removed from pixels of the adjusted to-be-adjusted area to obtain first multimedia data.

Figure 8:
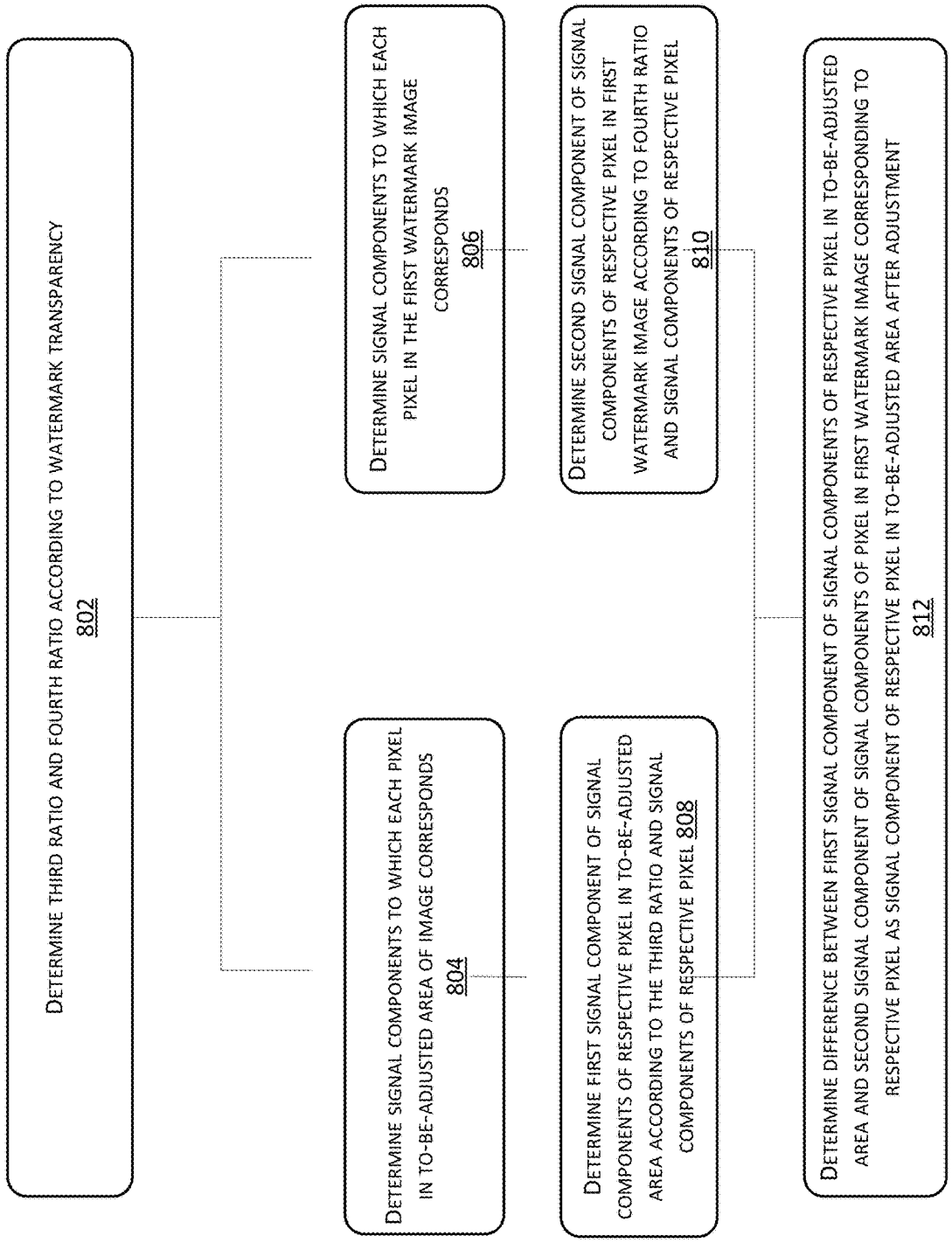
FIG. 8 shows a flow chart of a watermark processing method according to an example embodiment of the present disclosure.

FIG. 8 shows a flow chart of a watermark processing method according to an example embodiment of the present disclosure.

In an example implementation, as shown in FIG. 8, adjusting values of pixels in the to-be-adjusted area of the image according to the watermark transparency and the first watermark image may comprise the following steps:

Step 802, determining a third ratio and a fourth ratio according to the watermark transparency.

For example, a server may determine a ratio between the foregoing 1 and the foregoing watermark transparency as a third ratio and may determine a difference between 1 and the foregoing watermark transparency and further determine a ratio between the foregoing difference and the watermark transparency as a fourth ratio; or may determine a ratio between the foregoing difference and the watermark transparency as a third ratio, and a radio between the foregoing 1 and the foregoing watermark transparency as a fourth ratio.

In fact, it is feasible to determine a third ratio and a fourth ratio according to the foregoing watermark transparency. The present disclosure sets no limitation to methods for determining the third ratio and the fourth ratio.

Step 804, determining signal components to which each pixel in the to-be-adjusted area of the image corresponds.

Step 806, determining signal components to which each pixel in the first watermark image corresponds.

Here, the signal components comprise: a luminance signal component Y, a first chrominance signal component U and a second chrominance signal component V;

A terminal device may determine a luminance signal component Y, a first chrominance signal component U and a second chrominance signal component V to which each pixel in a to-be-adjusted area of the foregoing first multimedia data; and may determine a luminance signal component Y, a first chrominance signal component U and a second chrominance signal component V to which each pixel in the foregoing first watermark image corresponds.

Step 808, determining a first signal component of signal components of a respective pixel in the to-be-adjusted area according to the third ratio and the signal components of the respective pixel.

A terminal device may determine a luminance signal component Y, a first chrominance signal component U and a second chrominance signal component V of each pixel in a to-be-adjusted area of first multimedia data and may determine, according to the foregoing third ratio, first signal components to which the luminance signal component Y, the first chrominance signal component U and the second chrominance signal component V of each pixel correspond respectively. For example, the first signal components of each pixel in the to-be-adjusted area may comprise a luminance signal component Y3, a first chrominance signal component U3 and a second chrominance signal component V3.

In an example, a product of the foregoing third ratio and signal components of pixels in the foregoing to-be-adjusted area may be determined to be the foregoing first signal components.

Step 810, determining a second signal component of signal components of a respective pixel in the first watermark image according to the fourth ratio and the signal components of the respective pixel.

A terminal device may determine a luminance signal component Y, a first chrominance signal component U and a second chrominance signal component V of each pixel in a first watermark image, and may determine, according to the foregoing fourth ratio, second signal components to which the luminance signal component Y, the first chrominance signal component U and the second chrominance signal component V of each pixel correspond respectively. For example, the second signal components of each pixel in the first watermark image may comprise a luminance signal component Y4, a first chrominance signal component U4 and a second chrominance signal component V4.

In an example, a product of the foregoing fourth ratio and signal components of pixels in the foregoing first watermark image may be determined to be the foregoing second signal components.

Step 812, determining a difference between a first signal component of signal components of a respective pixel in the to-be-adjusted area and a second signal component of signal components of a pixel in the first watermark image corresponding to the respective pixel as a signal component of the respective pixel in the to-be-adjusted area after adjustment.

For each pixel in a to-be-adjusted area of the foregoing first multimedia data, a terminal device may determine a difference between a first signal component to which a luminance signal component Y of the pixel corresponds and a second signal component to which a luminance signal component Y of a pixel corresponding to this pixel in the foregoing first watermark image corresponds as an adjusted luminance signal component Y of this pixel; the terminal device may determine a difference between a first signal component to which a first chrominance signal component U of the pixel corresponds and a second signal component to which a first chrominance signal component U of a pixel corresponding to this pixel in the foregoing first image corresponds as an adjusted first chrominance signal component U of this pixel; the terminal device may determine a difference between a first signal component to which a second chrominance signal component V of the pixel corresponds and a second signal component to which a second chrominance signal component V of a pixel corresponding to this pixel in the foregoing first image corresponds as an adjusted second chrominance signal component V of this pixel; the server may determine multimedia data obtained after adjusting the to-be-adjusted area of the foregoing first multimedia data as original multimedia data.

For example, a terminal device may determine adjustment of every pixel in a to-be-adjusted area according to Formula III:

$$Y = \frac{1}{\text{alpha}} \times Y\_decode + \frac{1 - \text{alpha}}{\text{alpha}} \times Y\_watermark \quad \text{Formula III}$$

$$U = \frac{1}{\text{alpha}} \times U\_decode + \frac{1 - \text{alpha}}{\text{alpha}} \times U\_watermark$$

$$V = \frac{1}{\text{alpha}} \times V\_decode + \frac{1 - \text{alpha}}{\text{alpha}} \times V\_watermark$$

Where, the foregoing Y_decode may denote a luminance signal component Y of each pixel in a to-be-adjusted area of first multimedia data; U_decode may denote a first chrominance signal component U of each pixel in a to-be-adjusted area of first multimedia data; V_decode may denote a second chrominance signal component V of each pixel in a to-be-adjusted area of first multimedia data; Y_watermark may denote a luminance signal component Y of each pixel in a first watermark image; U_watermark may denote a first chrominance signal component U of each pixel in a first watermark image; V_watermark may denote a second chrominance signal component V of each pixel in a first watermark image;

alpha may denote watermark transparency, $$\frac{1}{\text{alpha}}$$

may denote a third ratio, $$\frac{1 - \text{alpha}}{\text{alpha}}$$

may denote a fourth ratio; Y may denote a luminance signal component Y of each pixel in a to-be-adjusted area of first multimedia data after adjustment, U may denote a first chrominance signal component U of each pixel in a to-be-adjusted area of first multimedia data after adjustment, and V may denote a second chrominance signal component V of each pixel in a to-be-adjusted area of first multimedia data after adjustment.

Further, the foregoing watermark image may be in a standard image file format, such as bmp, jpg or png, and may also be an uncompressed image in a YUV format. For a watermark image in a standard image file format, a server may convert the watermark image from an RGB color space into a YUV color space after the foregoing watermark image is decoded. The conversion method may refer to international standard BT.709 and other relevant regulations.

In this way, a terminal device may inversely overlap the watermark for first multimedia data through watermark parameters carried in a multimedia code stream to obtain original multimedia data without the watermark. As the second multimedia code stream is multimedia content overlapped with a watermark, when unlicensed broadcasting or hotlinking occurs, multimedia content broadcast on an unlicensed broadcasting or hotlinking platform contains the watermark. This may protect the copyright interest of the platform owing the multimedia content, while when a user of the platform owing the multimedia content receives the foregoing multimedia content broadcast through a terminal device, as the foregoing second multimedia code stream carries watermark parameters, the terminal device may inversely overlap the watermark according to the foregoing watermark parameters to obtain multimedia content without the watermark. The watermark processing method and apparatus according to example embodiments of the present disclosure may prevent unlicensed broadcasting and hotlinking through a watermark and meanwhile does not display the watermark during broadcasting to avoid affecting watch experience of audience.

Figure 9:
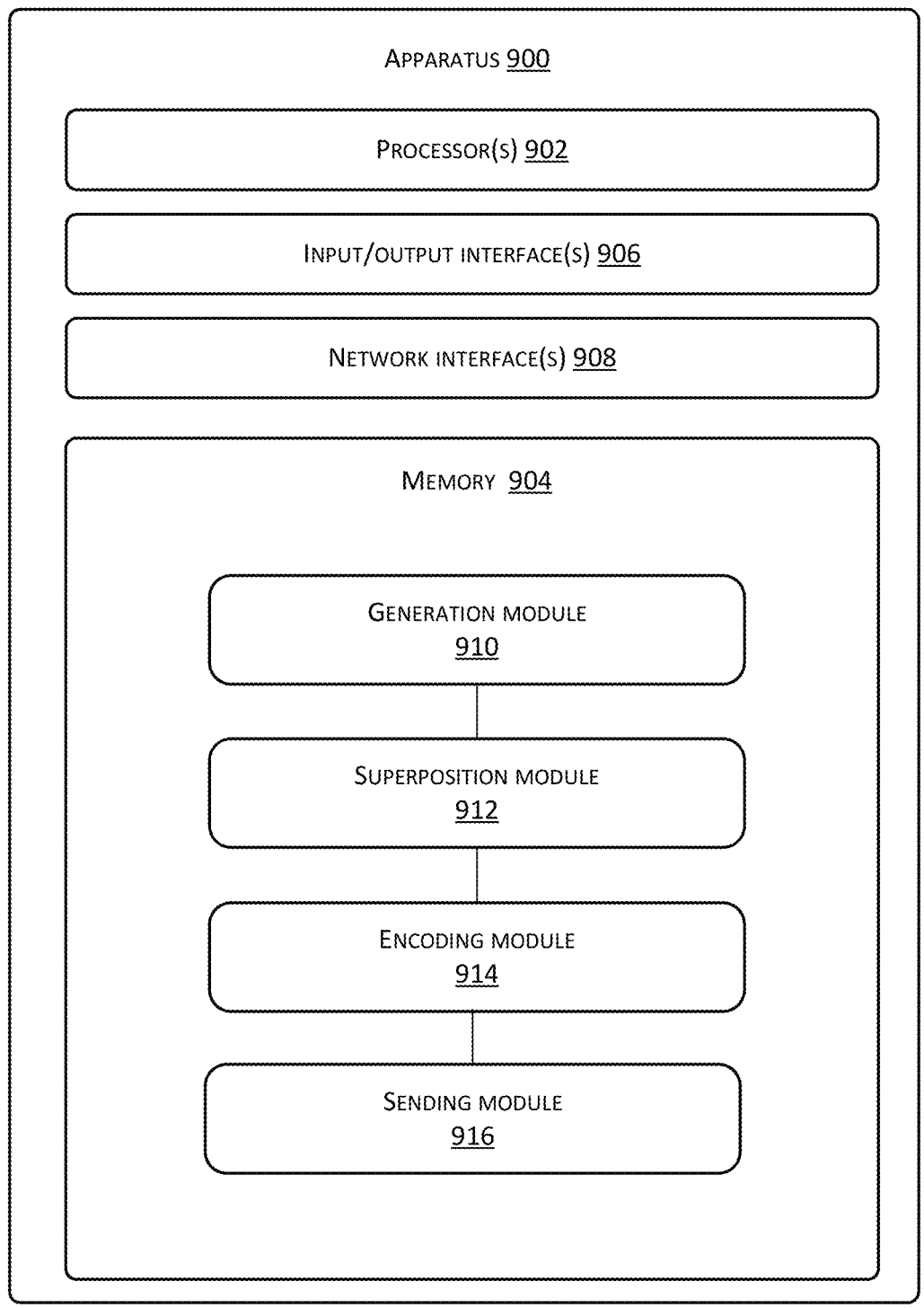
FIG. 9 shows a structure block diagram of a watermark processing apparatus according to an example embodiment of the present disclosure.

FIG. 9 shows a structure block diagram of a watermark processing apparatus 900 according to an example embodiment of the present disclosure. The apparatus 900 may be used in a server. As shown in FIG. 9, the apparatus 900 includes one or more processor(s) 902 or data processing unit(s) and memory 904. The apparatus 900 may further include one or more input/output interface(s) 906 and one or more network interface(s) 908. The memory 904 is an example of computer readable medium or media.

The computer readable medium includes non-volatile and volatile media as well as removable and non-removable storage media. A storage medium may store information by means of any method or technology. The information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic disk storage or other magnetic storage devices, or any other non-transmission media, and may be used to store information accessible to the computing device. According to the definition in this text, the computer readable medium does not include transitory medium, such as modulated data signals and carriers.

The memory 904 may store therein a plurality of modules or units including a generation module 910, a superposition module 912, an encoding module 914 and a sending module 916, wherein:

the generation module 910 may be used for generating watermark parameters for original multimedia data;

the superposition module 912 may be used for performing watermark superposition processing on the original multimedia data according to the watermark parameters to obtain first multimedia data;

the encoding module 914 may be used for encoding the first multimedia data to obtain a first multimedia code stream and encapsulating the watermark parameters into the first multimedia code stream to obtain a second multimedia code stream;

the sending module 916 may be used for sending the second multimedia code stream to a terminal device so that the terminal device performs watermark inverse superposition processing on the first multimedia data according to the watermark parameters to obtain original multimedia data;

Here, the inverse superposition processing is an inverse process of performing watermark superposition processing on the original multimedia data.

Figure 10:
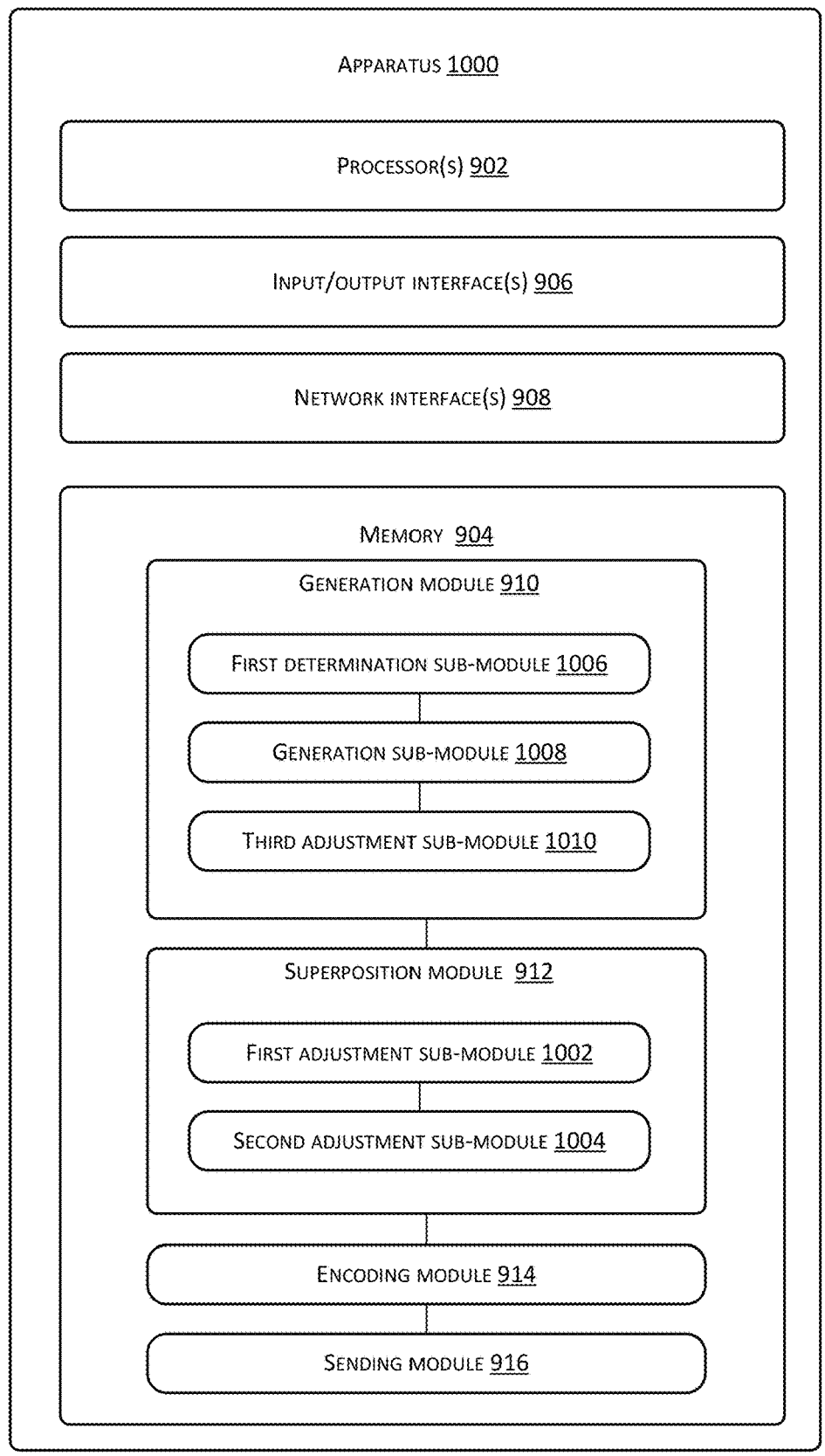
FIG. 10 shows a structure block diagram of a watermark processing apparatus according to an example embodiment of the present disclosure.

FIG. 10 shows a structure block diagram of a watermark processing apparatus 1000 according to an example embodiment of the present disclosure. As shown in FIG. 10, the apparatus 1000 includes one or more processor(s) 902 or data processing unit(s) and memory 904. The apparatus

1000 may further include one or more input/output interface(s) 906 and one or more network interface(s) 908. The memory 904 is an example of computer readable medium or media. The memory 904 may store therein a plurality of modules or units including the generation module 910, the superposition module 912, the encoding module 914 and the sending module 916.

In an example implementation, the watermark parameters may include watermark logo, watermark position, watermark size and watermark transparency. As shown in FIG. 10, the superposition module 912 may comprise:

a first adjustment sub-module 1002, which may be used for adjusting a size of a watermark image to which the watermark logo corresponds according to the watermark size to obtain a first watermark image; and a second adjustment sub-module 1004, which may be used for determining a to-be-adjusted area of each image in the original multimedia data according to the watermark position and the watermark size, and adjusting values of pixels in the to-be-adjusted area of the image according to the watermark transparency and the first watermark image to obtain first multimedia data.

In an example implementation, as shown in FIG. 10, the second adjustment sub-module 1004 may comprise the following units (not shown in FIG. 10):

a first determination unit, which may be used for determining a first ratio and a second ratio according to the watermark transparency;

a second determination unit, which may be used for determining signal components to which each pixel in the to-be-adjusted area of the image corresponds;

a third determination unit, which may be used for determining signal components to which each pixel in the first watermark image corresponds; here, the signal components comprise: a luminance signal component Y, a first chrominance signal component U and a second chrominance signal component V;

a fourth determination unit, which may be used for determining a first signal component of signal components of each pixel in the to-be-adjusted area according to the first ratio and the signal components of the pixel;

a fifth determination unit, which may be used for determining a second signal component of signal components of each pixel in the first watermark image according to the second ratio and the signal components of the pixel; and a sixth determination unit, which may be used for determining a sum of a first signal component of signal components of a respective pixel in the to-be-adjusted area and a second signal component of signal components of a pixel in the first watermark image corresponding to the respective pixel as a signal component of the respective pixel after adjustment.

In an example implementation, as shown in FIG. 10, the generation module 910 may comprise:

a first determination sub-module 1006, which may be used for determining reference values of watermark parameters a generation sub-module 1008, which may be used for generating adjustment parameters; and a third adjustment sub-module 1010, which may be used for adjusting the reference values of the watermark parameters according to the adjustment parameters to obtain the watermark parameters.

Figure 11:
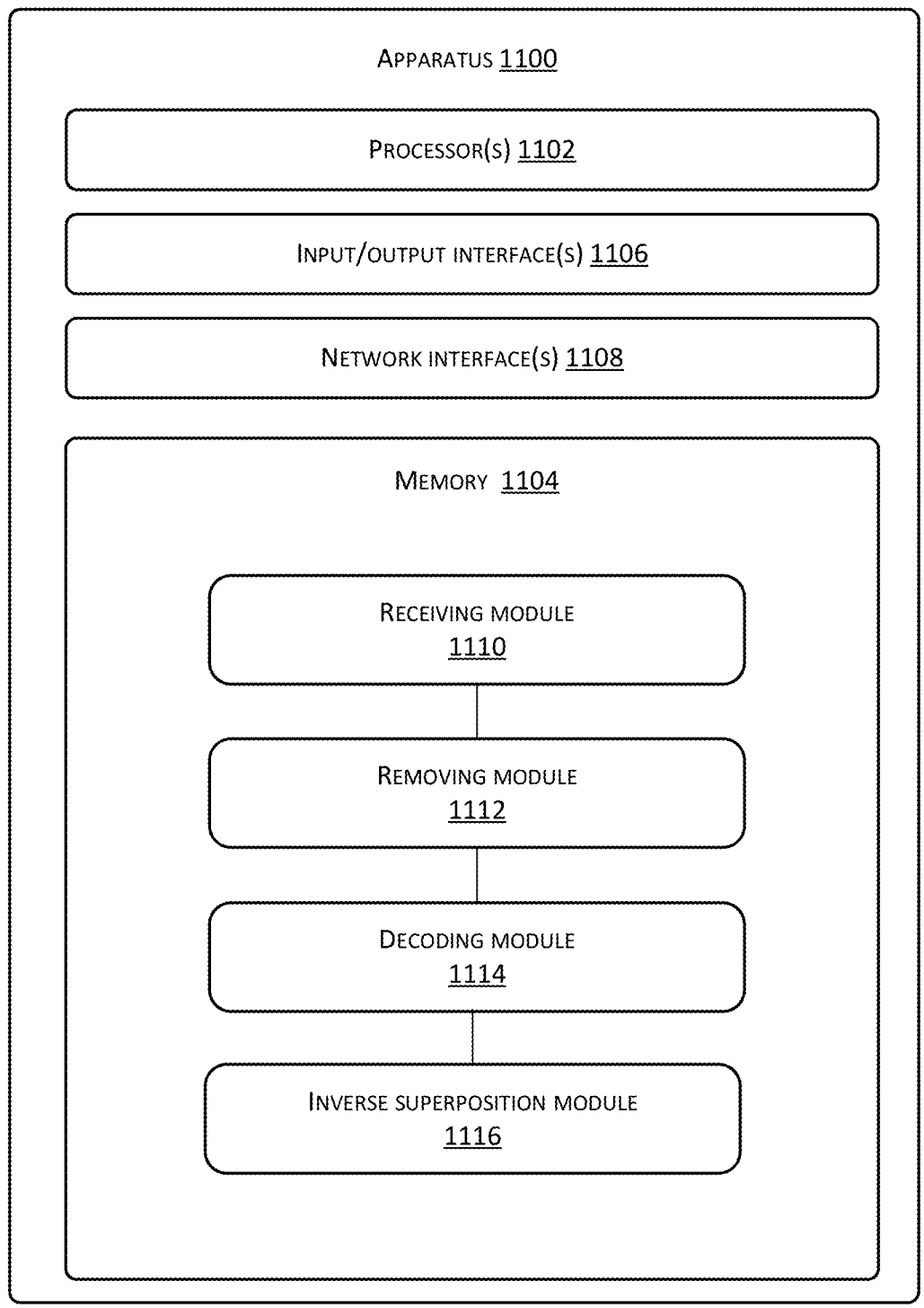
FIG. 11 shows a structure block diagram of a watermark processing apparatus according to an example embodiment of the present disclosure.

FIG. 11 shows a structure block diagram of a watermark processing apparatus 1100 according to an example embodiment of the present disclosure. The apparatus 1100 may be used in a terminal device. As shown in FIG. 11, the apparatus 1100 includes one or more processor(s) 1102 or data processing unit(s) and memory 1104. The apparatus 1100 may further include one or more input/output interface(s) 1106 and one or more network interface(s) 1108. The memory 1104 is an example of computer readable medium or media. The memory 1104 may store therein a plurality of modules or units including: a receiving module 1110, a removing module 1112, a decoding module 1114 and an inverse superposition module 1116; wherein, the receiving module 1110 may be used for receiving a multimedia code stream to obtain watermark parameters carried in the multimedia code stream;

the removing module 1112 may be used for removing the watermark parameters in the multimedia code stream to obtain a first multimedia code stream;

the decoding module 1114 may be used for decoding the first multimedia code stream to obtain first multimedia data; and the inverse superposition module 1116 may be used for performing watermark inverse superposition processing on the first multimedia data according to the watermark parameters to obtain original multimedia data;

Here, the inverse superposition processing is an inverse process of performing watermark superposition processing on the original multimedia data.

Figure 12:
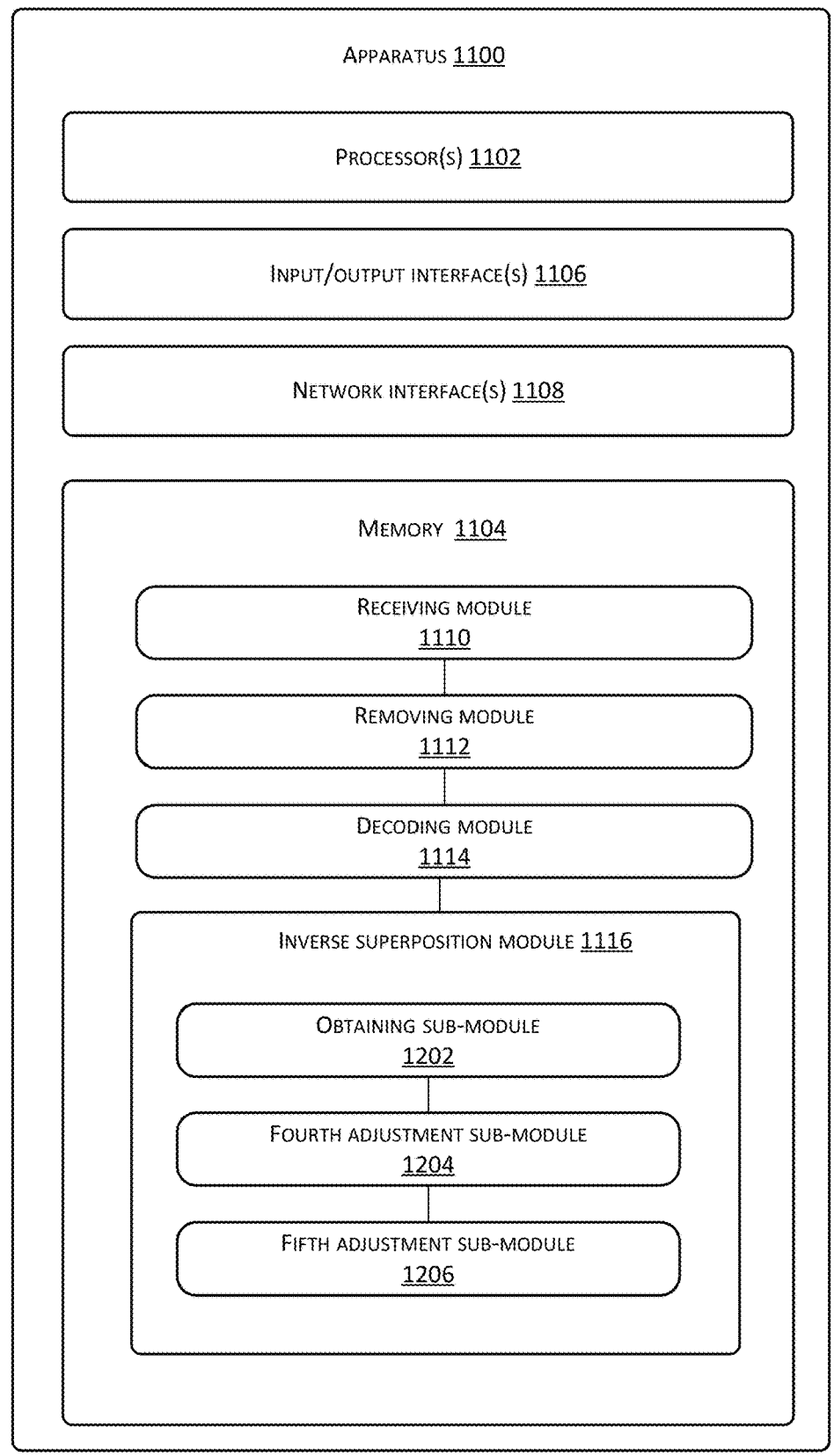
FIG. 12 shows a structure block diagram of a watermark processing apparatus according to an example embodiment of the present disclosure.

FIG. 12 shows a structure block diagram of a watermark processing apparatus 1200 according to an example embodiment of the present disclosure. As shown in FIG. 12, the apparatus 1200 includes one or more processor(s) 1102 or data processing unit(s) and memory 1104. The apparatus 1100 may further include one or more input/output interface(s) 1106 and one or more network interface(s) 1108. The memory 1104 is an example of computer readable medium or media. The memory 1104 may store therein a plurality of modules or units including: the receiving module 1110, the removing module 1112, the decoding module 1114 and the inverse superposition module 1116.

In an example implementation, the watermark parameters may include watermark logo, watermark position, watermark size and watermark transparency. As shown in FIG. 12, the inverse superposition module 1116 may comprise:

an obtaining sub-module 1202, which may be used for obtaining a watermark image to which the watermark logo corresponds;

a fourth adjustment sub-module 1204, which may be used for adjusting a size of the watermark image according to the watermark size to obtain a first watermark image; and a fifth adjustment sub-module 1206, which may be used for determining a to-be-adjusted area of each image in the first multimedia data according to the watermark position and the watermark size, and adjusting values of pixels in the to-be-adjusted area of the image according to the watermark transparency and the first watermark image.

In an example implementation, as shown in FIG. 12, the fifth adjustment sub-module 1206 may comprise the following units (not shown in FIG. 12):

a seventh determination unit, which may be used for determining a third ratio and a fourth ratio according to the watermark transparency;

an eighth determination unit, which may be used for determining signal components to which each pixel in the to-be-adjusted area of the image corresponds;

a ninth determination unit, which may be used for determining signal components to which each pixel in the first watermark image corresponds; here, the signal components comprise: a luminance signal component Y, a first chrominance signal component U and a second chrominance signal component V;

a tenth determination unit, which may be used for determining a first signal component of signal components of each pixel in the to-be-adjusted area according to the third ratio and the signal components of the pixel;

an eleventh determination unit, which may be used for determining a second signal component of signal components of each pixel in the first watermark image according to the fourth ratio and the signal components of the pixel; and a twelfth determination unit, which may be used for determining a difference between a first signal component of signal components of a respective pixel in the to-be-adjusted area and a second signal component of signal components of a pixel in the first watermark image corresponding to the respective pixel as a signal component of the respective pixel after adjustment.

Figure 13:
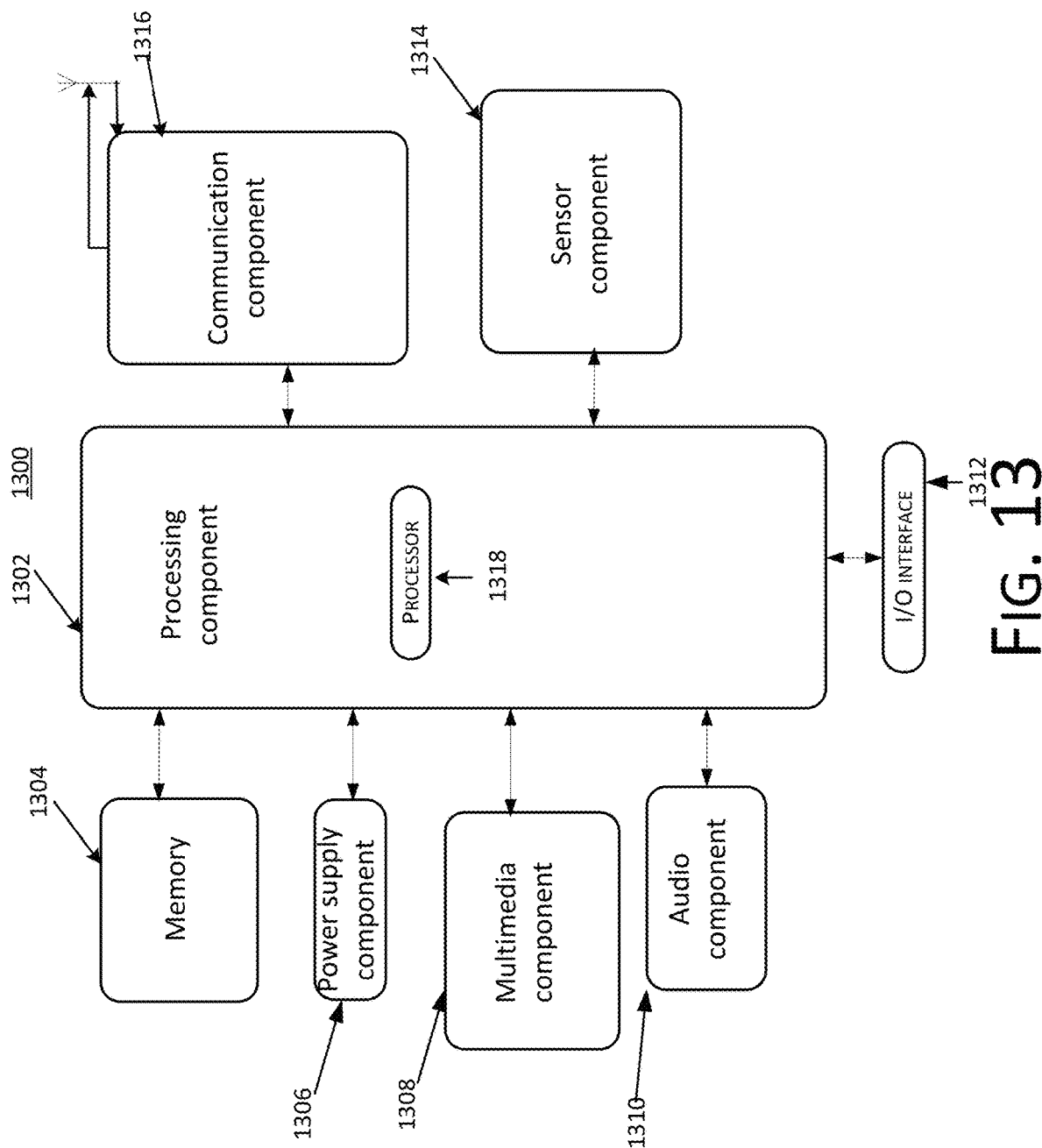
FIG. 13 shows a block diagram of an apparatus 1300 for processing a watermark according to an example embodiment.

FIG. 13 shows a block diagram of an apparatus 1300 for processing a watermark according to an example embodiment. For example, the apparatus 1300 may be a mobile phone, a computer, a digital broadcasting terminal, a message transceiver, a game console, a tablet device, a medical device, a fitness device or a PDA (personal digital assistant).

As shown in FIG. 13, the apparatus 1300 may comprise one or more components: a processing component 1302, a memory 1304, a power supply component 1306, a multimedia component 1308, an audio component 1310, an I/O interface 1312, a sensor component 1314 and a communication component 1316.

The processing component 1302 typically controls overall operation of the apparatus 1300, such as display, telephone call, digital communication, camera operation and operations relevant with recording operation. The processing component 1302 may comprise one or more processors 1318 to execute instructions and complete all or some of steps of the foregoing method. Further, the processing component 1302 may comprise one or more modules to facilitate interaction between the processing component 1302 and other components. For example, the processing component 1302 may comprise a multimedia module to facilitate interaction between the multimedia component 1208 and the processing component 1302.

The memory 1304 is configured to store various types of data to support operation on the apparatus 1300. Examples of the data include instructions of any application or method used in operation on the apparatus 1300, data of contact persons, data of telephone directory, messages, images and video. The memory 1304 may be achieved by any type of volatile or nonvolatile memory devices or their combination, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or compact disc.

The power supply component 1306 provides power for various components of the apparatus 1200. The power supply component 1306 may comprise a power management system, one or more power supplies, and other components that are associated with generation, management and distribution of power for the apparatus 1300.

The multimedia component 1308 comprises a screen providing an output interface between the apparatus 1300 and a user. In some example embodiments, the screen may comprise a liquid crystal display (LCD) and a touch panel (TP). If the screen comprises a TP, the screen may be achieved as a touch screen to receive input signals from a user. The TP comprises one or more touch sensors to sense touch, slide and gestures on the TP. The touch sensors may not only sense boundaries of touch or slid actions but also detect durations and pressures relevant to the touch or slide operations. In some example embodiments, the multimedia component 1308 comprises a front camera and/or a rear camera. When the apparatus 1300 is in an operation mode, such as a shooting mode or a video mode, the front camera and/or the rear camera may receive external multimedia data. Each of the front camera and the rear camera may be a fixed optical lens system or have a focal length and a capacity of optical zooming.

The audio component 1310 is configured to output and/or input audio signals. For example, the audio component 1310 comprises a microphone (MIC). When the apparatus 1300 is in an operation mode, such as a call mode, a recording mode or a voice recognition mode, the MIC is configured to receive external audio signals. Received audio signals may be further stored in the memory 1304 or be sent via the communication component 1316. In some example embodiments, the audio component 1210 further comprises a loudspeaker, for outputting audio signals.

The I/O interface 1312 provides an interface between the processing component 1302 and a peripheral interface module. The foregoing peripheral interface module may be a keyboard, a click wheel or a button. These buttons may include without limitation: a homepage button, a volume button, a start button and a lock button.

The sensor component 1314 comprises one or more sensors, for providing status evaluation in all aspects for the apparatus 1300. For example, the sensor component 1314 may detect on/off status of the apparatus 1300 and relative positioning of components. For example, the components are a display and a keypad of the apparatus 1300. The sensor component 1314 may further detect position changes of the apparatus 1300 or a component of the apparatus 1300, existence or non-existence of contacts between a user and the apparatus 1300, orientation or acceleration/deceleration of the apparatus 1300 and temperature changes of the apparatus 1300. The sensor component 1314 may comprise a proximity sensor, configured to detect existence of nearby objects without any physical contact. The sensor component 1314 may further comprise an optical sensor, such as CMOS or CCD image sensor, for use in imaging application. In some example embodiments, the sensor component 1314 may further comprise an acceleration sensor, a gyroscope sensor, a magnetic sensor, a pressure sensor or a temperature sensor.

The communication component 1316 is configured to facilitate wired or wireless communication between the apparatus 1300 and other devices. The apparatus 1300 may access a wireless network based on communication standards, such as WiFi, 2G or 3G, or their combination. In an example embodiment, the communication component 1316 receives broadcast signals or broadcast-related information from an external broadcast management system via a broadcast channel. In an example embodiment, the communication component 1216 further comprises a near field communication (NFC) module to promote short range communication. For example, in a NFC module, the promotion may be achieved based on radio frequency identification (RFID) technology, Infrared Data Association (IrDA) technology, ultra-wide band (UWB) technology, Bluetooth (BT) technology and other technologies.

In example embodiments, the apparatus 1300 may be achieved through one or more application-specific integrated circuits (ASIC), digital signal processors (DSP), digital signal processing device (DSPD), programmable logic devices (PLD), field-programmable gate arrays (FPGA), controllers, microcontrollers, microprocessors or other electronic elements and is used to execute the foregoing method.

In example embodiments, a non-volatile computer readable memory medium is further provided, such as a memory 1304 containing computer-readable instructions. The foregoing computer-readable instructions may be executed by a processor 1220 of the apparatus 1200 to complete the foregoing method.

Figure 14:
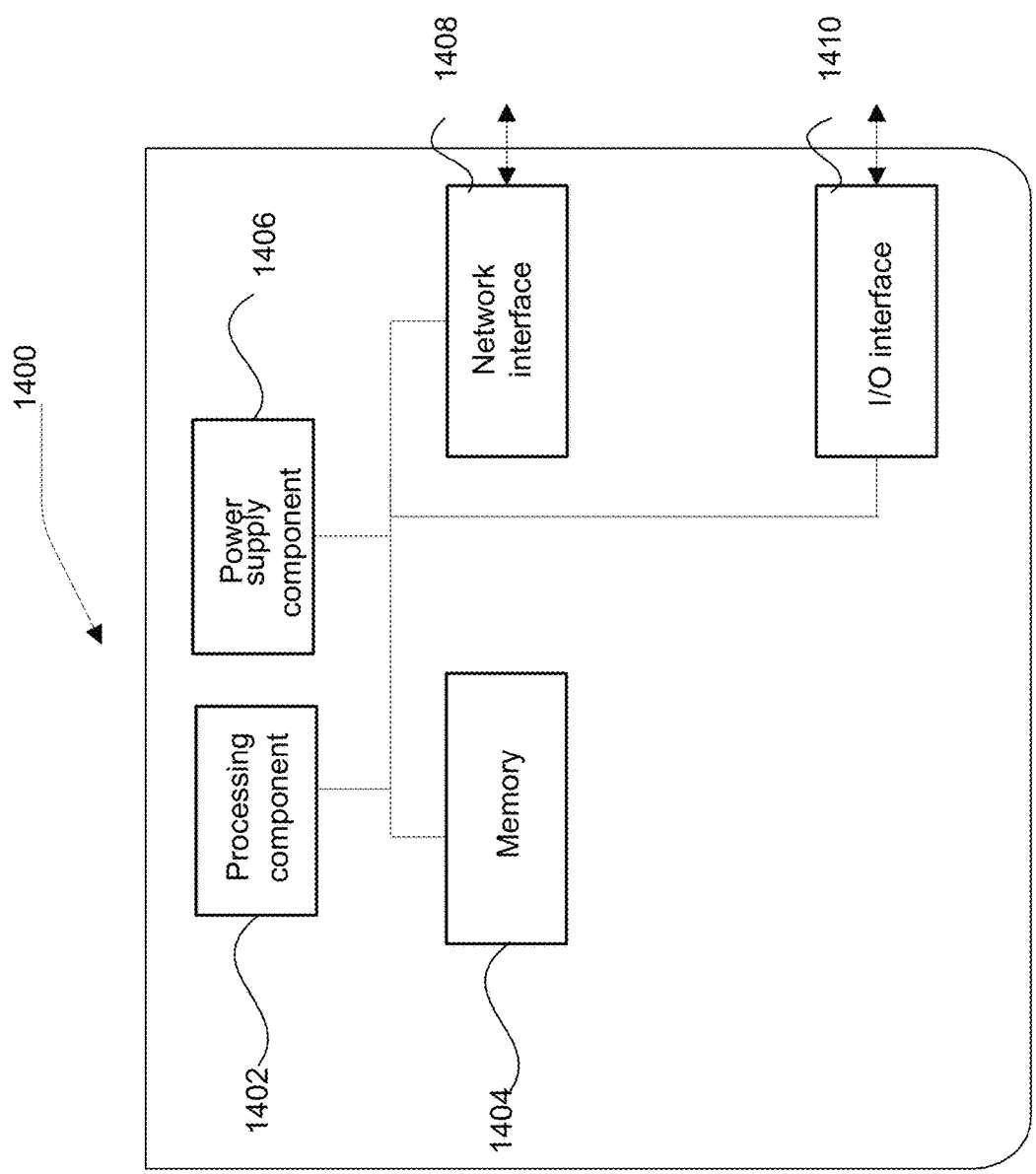
FIG. 14 shows a block diagram of an apparatus 1400 for processing a watermark according to an example embodiment.

FIG. 14 shows a block diagram of an apparatus 1400 for processing a watermark according to an example embodiment. For example, the apparatus 1400 may be provided as a server. As shown in FIG. 14, the apparatus 1400 comprises a processing component 1402, and further comprises one or more processors, as well as memory resources represented by a memory 1404 and used to store computer-readable instructions, such as applications, that may be executed by the processing component 1402. Applications stored in the memory 1404 may comprise one or more modules each of which corresponds to a group of instructions. Further, the processing component 1402 is configured to be an executive instruction to execute the foregoing method.

The apparatus 1400 may further comprise a power supply component 1406, configured to execute power management of the apparatus 1400, a wired or wireless network interface 1408 configured to connect the apparatus 1400 to a network, and an I/O interface 1410. The apparatus 1400 may operate an operating system based on storage in the memory 19404, such as Windows Server™, Mac OS X™, Unix™, Linux™, FreeBSD™ or any other similar operating system.

In example embodiments, a non-volatile computer readable memory medium is further provided, such as a memory 1404 containing computer-readable instructions. The foregoing containing computer-readable instructions may be executed by a processing component 1402 of the apparatus 1400 to complete the foregoing method.

The present disclosure may be a system, a method and/or a computer program product. The computer program product may comprise a computer readable memory medium, which carries computer-readable instructions that enable a processor to achieve all aspects of the present disclosure.

A computer readable memory medium may be a tangible device that may maintain and store instructions used by an instruction executing device. For example, a computer readable memory medium may be—without limitation—an electric memory device, a magnetic memory device, an optical memory device, an electromagnetic memory device, a semiconductor memory device or any appropriate combination of the foregoing devices. More concrete examples of computer readable memory media (an unexhaustive list) include: portable computer, hard disk, random access memory (RAM), read only memory (ROM), erasable programmable read only memory (EPROM or flash memory), static random access memory (SRAM), portable compact disc—read only memory (CD-ROM), digital video disk (DVD), memory stick (MS), floppy disk, mechanical coding device, punch card, for example, on which instructions are stored or convex structure inside a groove, or any appropriate combination of the foregoing devices. Here, computer readable memory media are not interpreted as instantaneous signals per se, such as radio waves, or other freely transmitted electromagnetic waves, electromagnetic waves transmitted through waveguide or other transmission media (such as, optical pulse through optical cables) or electrical signals transmitted through electric wires.

The computer-readable instructions described here may be downloaded from a computer readable memory medium to various computing/processing devices, or downloaded to external computers or external memory devices via a network, such as Internet, LAN, WAN and/or wireless network. The network may comprise copper transmission cables, optical fiber transmission, wireless transmission, a router, a firewall, a switch, a gate computer and/or an edge server. The network adaptor or network interface in each computing/processing device receives computer-readable instructions from the network and forward the computer-readable instructions so that the computer-readable instructions are stored in a computer readable memory medium in each computing/processing device.

Computer-readable instructions for executing operations of the present disclosure may be assembly instructions, instruction set architecture (ISA) instructions, machine instructions, machine-related instructions, microcodes, firmware instructions, status setting data, or source codes or target codes compiled through free combination of one or more programming languages. The programming languages include object-oriented programming languages—such as Smalltalk and C++, as well as conventional procedural programming languages—such as "C" language or similar programming languages. Computer-readable instructions may be fully executed on a user computer, or partially executed on a user computer, or executed as an independent software package, or partially executed on a user computer and partially executed on a remote computer, or fully executed on a remote computer or server. When a remote computer is involved, the remote computer may be connected to a user computer via any type of network—including LAN or WAN, or may be connected to an external computer (for example, connected via the Internet of an Internet service provider). In some example embodiments, status information of computer-readable instructions is used to customize electronic circuits in an individualized manner, such as programmable logic circuit (PLD), field-programmable gate array (FPGA) or programmable gate array (PLA). The electronic circuits may execute computer readable program instructions, thereby achieving all aspects of the present disclosure.

Here, all aspects of the present disclosure are described with reference to flow charts and/or block diagrams of the methods, apparatuses (systems) and computer program products according to example embodiments of the present disclosure. It should be understood that every box of the flow charts and/or block diagrams as well as combinations of the boxes in the block diagrams may be achieved through computer readable program instructions.

These computer-readable instructions may be provided to a general-purpose computer, a special-purpose computer, or a processor of any other programmable data processing apparatus, thereby generating a machine that causes generation of an apparatus, which achieves functions/actions specified in one or more boxes in the flow charts and/or block diagrams when these instructions are executed through a computer or a processor of any other programmable data processing apparatus. Alternatively, these computer-readable instructions may be stored in a computer readable memory medium. These instructions cause the computer, programmable processing apparatus and/or other devices to work in a specific manner. Thereby, the computer readable memory medium storing instructions comprises a product, which comprises instructions that achieve the functions/actions specified in one or more boxes in the flow charts and/or block diagrams.

Alternatively, computer-readable instructions may be loaded to computers, other programmable data processing apparatuses or other devices, causing that a series of operating steps are executed on the computers, other programmable data processing apparatuses or other devices to generate a process achieved on a computer, thereby causing instructions executed on the computers, other programmable data processing apparatuses or other devices to achieve the functions/actions specified in one or more boxes in the flow charts and/or block diagrams.

The flow charts and block diagrams of the accompanying drawings show system architecture, functions and operations that are likely achieved by the systems, methods and computer program products according to a plurality of example embodiments of the present disclosure. At this point, every box in the flow charts or block diagrams may represent a part of a module, a program segment or an instruction. The part of the module, program segment or instruction includes one or more executable instructions that are used to achieve specified logic functions. In some alternative achievements, the functions stated in the boxes may happen in an order different from the order stated in the accompanying drawing. For example, two continuous boxes in fact may be substantially executed in parallel and sometimes may be executed in a reverse order, too, depending on involved functions. It should also be noted that every box in the block diagrams and/or flow charts and combinations of the boxes in the block diagrams and/or flow charts may be achieved by a special hardware-based system that executes specified functions or actions, or may be achieved by a combination of special hardware and computer instructions.

Some example embodiments of the present disclosure have been described above. The above description is exemplary, not exhaustive and not limited to the disclosed example embodiments. Many modifications and changes without departing from the scope and spirit of the described example embodiments are obvious to those of ordinary skill. The terms used in this document are selected for best explaining the principles and actual application of example embodiments, or improvement to technologies in the market, or for enabling other people of ordinary skill in the art to understand the example embodiments disclosed in this document.

The present disclosure may further be understood with clauses as follows.

1. A watermark processing method, wherein the method is used in a server and comprises:
generating watermark parameters for original multimedia data;
performing watermark superposition processing on the original multimedia data according to the watermark parameters to obtain first multimedia data;
encoding the first multimedia data to obtain a first multimedia code stream and encapsulating the watermark parameters into the first multimedia code stream to obtain a second multimedia code stream; and
sending the second multimedia code stream to a terminal device so that the terminal device performs watermark inverse superposition processing on the first multimedia data according to the watermark parameters to obtain original multimedia data,
wherein the inverse superposition processing is an inverse process of performing watermark superposition processing on the original multimedia data.

2. The method as described in clause 1, wherein:
the watermark parameters include watermark logo, watermark position, watermark size and watermark transparency; and
the performing watermark superposition processing on the original multimedia data according to the watermark parameters to obtain first multimedia data comprises:
adjusting a size of a watermark image to which the watermark logo corresponds according to the watermark size to obtain a first watermark image; and
determining a to-be-adjusted area of each image in the original multimedia data according to the watermark position and the watermark size, and adjusting values of pixels in the to-be-adjusted area of the image according to the watermark transparency and the first watermark image to obtain first multimedia data.

3. The method as described in clause 2, wherein adjusting values of pixels in the to-be-adjusted area of the image according to the watermark transparency and the first watermark image comprises:
determining a first ratio and a second ratio according to the watermark transparency;
determining signal components to which each pixel in the to-be-adjusted area of the image corresponds;
determining signal components to which each pixel in the first watermark image corresponds; here, the signal components comprising: a luminance signal component Y, a first chrominance signal component U and a second chrominance signal component V;
determining a first signal component of signal components of each pixel in the to-be-adjusted area according to the first ratio and the signal components of the pixel;
determining a second signal component of signal components of each pixel in the first watermark image according to the second ratio and the signal components of the pixel; and
determining a sum of a first signal component of signal components of a respective pixel in the to-be-adjusted area and a second signal component of signal components of a pixel in the first watermark image corresponding to the respective pixel as a signal component of the respective pixel after adjustment.

4. The method as described in clause 1, wherein the generating watermark parameters for original multimedia data comprises:
determining reference values of watermark parameters;
generating adjustment parameters; and
adjusting the reference values of the watermark parameters according to the adjustment parameters to obtain the watermark parameters.

5. A watermark processing method, wherein the method is used in a terminal device and comprises:
receiving a multimedia code stream to obtain watermark parameters carried in the multimedia code stream;
removing the watermark parameters in the multimedia code stream to obtain a first multimedia code stream;
decoding the first multimedia code stream to obtain first multimedia data; and
performing watermark inverse superposition processing on the first multimedia data according to the watermark parameters to obtain original multimedia data,
wherein the inverse superposition processing is an inverse process of performing watermark superposition processing on the original multimedia data.

6. The method as described in clause 5, wherein:

the watermark parameters include watermark logo, watermark position, watermark size and watermark transparency; and the performing watermark inverse superposition processing on the first multimedia data according to the watermark parameters comprises:

obtaining a watermark image to which the watermark logo corresponds;

adjusting a size of the watermark image according to the watermark size to obtain a first watermark image; and determining a to-be-adjusted area of each image in the first multimedia data according to the watermark position and the watermark size, and adjusting values of pixels in the to-be-adjusted area of the image according to the watermark transparency and the first watermark image.

7. The method as described in clause 6, wherein the adjusting values of pixels in the to-be-adjusted area of the image according to the watermark transparency and the first watermark image comprises:

determining a third ratio and a fourth ratio according to the watermark transparency;

determining signal components to which each pixel in the to-be-adjusted area of the image corresponds;

determining signal components to which each pixel in the first watermark image corresponds, wherein the signal components comprising: a luminance signal component Y, a first chrominance signal component U and a second chrominance signal component V;

determining a first signal component of signal components of each pixel in the to-be-adjusted area according to the third ratio and the signal components of the pixel;

determining a second signal component of signal components of each pixel in the first watermark image according to the fourth ratio and the signal components of the pixel; and determining a difference between a first signal component of signal components of a respective pixel in the to-be-adjusted area and a second signal component of signal components of a pixel in the first watermark image corresponding to the respective pixel as a signal component of the respective pixel after adjustment.

8. A watermark processing apparatus, wherein the apparatus is used in a server and comprises:

a generation module, for generating watermark parameters for original multimedia data;

a superposition module, for performing watermark superposition processing on the original multimedia data according to the watermark parameters to obtain first multimedia data;

an encoding module, for encoding the first multimedia data to obtain a first multimedia code stream and encapsulating the watermark parameters into the first multimedia code stream to obtain a second multimedia code stream; and a sending module, for sending the second multimedia code stream to a terminal device so that the terminal device performs watermark inverse superposition processing on the first multimedia data according to the watermark parameters to obtain original multimedia data, wherein the inverse superposition processing being an inverse process of performing watermark superposition processing on the original multimedia data.

9. The apparatus as described in clause 8, wherein:

the watermark parameters include watermark logo, watermark position, watermark size and watermark transparency; and the superposition module comprises:

a first adjustment sub-module, for adjusting a size of a watermark image to which the watermark logo corresponds according to the watermark size to obtain a first watermark image; and a second adjustment sub-module, for determining a to-be-adjusted area of each image in the original multimedia data according to the watermark position and the watermark size, and adjusting values of pixels in the to-be-adjusted area of the image according to the watermark transparency and the first watermark image to obtain first multimedia data.

10. The apparatus as described in clause 9, wherein the second adjustment sub-module comprises:

a first determination unit, for determining a first ratio and a second ratio according to the watermark transparency;

a second determination unit, for determining signal components to which each pixel in the to-be-adjusted area of the image corresponds;

a third determination unit, for determining signal components to which each pixel in the first watermark image corresponds; here, the signal components comprising: a luminance signal component Y, a first chrominance signal component U and a second chrominance signal component V;

a fourth determination unit, for determining a first signal component of signal components of each pixel in the to-be-adjusted area according to the first ratio and the signal components of the pixel;

a fifth determination unit, for determining a second signal component of signal components of each pixel in the first watermark image according to the second ratio and the signal components of the pixel; and a sixth determination unit, for determining a sum of a first signal component of signal components of a respective pixel in the to-be-adjusted area and a second signal component of signal components of a pixel in the first watermark image corresponding to the respective pixel as a signal component of the respective pixel after adjustment.

11. The apparatus as described in clause 8, wherein the generation module comprises:

a first determination sub-module, for determining reference values of watermark parameters;

a generation sub-module, for generating adjustment parameters; and a third adjustment sub-module, for adjusting the reference values of the watermark parameters according to the adjustment parameters to obtain the watermark parameters.

12. A watermark processing apparatus, wherein the apparatus is used in a terminal device and comprises:

a receiving module, for receiving a multimedia code stream to obtain watermark parameters carried in the multimedia code stream;

a removing module, for removing the watermark parameters in the multimedia code stream to obtain a first multimedia code stream;

a decoding module, for decoding the first multimedia code stream to obtain first multimedia data; and an inverse superposition module, for performing watermark inverse superposition processing on the first multimedia data according to the watermark parameters to obtain original multimedia data, wherein the inverse superposition processing being an inverse process of performing watermark superposition processing on the original multimedia data.

13. The apparatus as described in clause 12, wherein:

the watermark parameters include watermark logo, watermark position, watermark size and watermark transparency; and the inverse superposition module comprises:
an obtaining sub-module, for obtaining a watermark image to which the watermark logo corresponds;
a fourth adjustment sub-module, for adjusting a size of the watermark image according to the watermark size to obtain a first watermark image; and
a fifth adjustment sub-module, for determining a to-be-adjusted area of each image in the first multimedia data according to the watermark position and the watermark size, and adjusting values of pixels in the to-be-adjusted area of the image according to the watermark transparency and the first watermark image.

14. The apparatus as described in clause 13, wherein the fifth adjustment sub-module comprises:
a seventh determination unit, for determining a third ratio and a fourth ratio according to the watermark transparency;
an eighth determination unit, for determining signal components to which each pixel in the to-be-adjusted area of the image corresponds;
a ninth determination unit, for determining signal components to which each pixel in the first watermark image corresponds; here, the signal components comprising: a luminance signal component Y, a first chrominance signal component U and a second chrominance signal component V;
a tenth determination unit, for determining a first signal component of signal components of each pixel in the to-be-adjusted area according to the third ratio and the signal components of the pixel;
an eleventh determination unit, for determining a second signal component of signal components of each pixel in the first watermark image according to the fourth ratio and the signal components of the pixel; and
a twelfth determination unit, for determining a difference between a first signal component of signal components of a respective pixel in the to-be-adjusted area and a second signal component of signal components of a pixel in the first watermark image corresponding to the respective pixel as a signal component of the respective pixel after adjustment.

15. A watermark processing apparatus, wherein the apparatus comprises:
a processor; and
memory storing computer-readable instructions executable by the one or more processors;
here, the processor being configured to execute the method in any of the clauses 1~7.

16. A non-volatile computer readable memory medium, storing computer-readable instructions, wherein the method in any of the clauses 1~7 is achieved when the computer-readable instructions are executed by the processor.

What is claimed is:
1. A method comprising:
generating watermark parameters for original multimedia data, the watermark parameters comprising: a watermark logo, a watermark position, a watermark size, and a watermark transparency;
performing watermark superposition processing on the original multimedia data according to the watermark parameters to obtain first multimedia data, wherein performing the watermark superposition processing on the original multimedia data comprises:
adjusting a size of a watermark image to which the watermark logo corresponds according to the watermark size to obtain a first watermark image;
determining a to-be-adjusted area of a respective image in the original multimedia data according to the watermark position and the watermark size; and
adjusting values of pixels in the to-be-adjusted area of the respective image according to the watermark transparency and the first watermark image to obtain the first multimedia data;
encoding the first multimedia data to obtain a first multimedia code stream;
encapsulating the watermark parameters into the first multimedia code stream to obtain a second multimedia code stream; and
sending the second multimedia code stream to a terminal device.

2. The method of claim 1, further comprising:
enabling the terminal device to perform watermark inverse superposition processing on the first multimedia data according to the watermark parameters to obtain the original multimedia data.

3. The method of claim 2, wherein the watermark inverse superposition processing is an inverse process of performing the watermark superposition processing on the original multimedia data.

4. The method of claim 1, wherein the adjusting values of the pixels in the to-be-adjusted area of the respective image according to the watermark transparency and the first watermark image comprises:
determining a first ratio and a second ratio according to the watermark transparency;
determining signal components to which a respective pixel in the to-be-adjusted area of the image corresponds;
determining signal components to which a respective pixel in the first watermark image corresponds, the respective pixel in the first watermark image corresponding to the respective pixel in the to-be-adjusted area;
determining a first signal component of the signal components of the respective pixel in the to-be-adjusted area according to the first ratio and the signal components of the respective pixel in the to-be-adjusted area;
determining a second signal component of the signal components of the respective pixel in the first watermark image according to the second ratio and the signal components of the respective pixel in the first watermark image; and
determining a sum of the first signal component of the signal components of the respective pixel in the to-be-adjusted area and the second signal component of the signal components of the respective pixel in the first watermark image as a signal component of the respective pixel in the to-be-adjusted area after adjustment.

5. The method of claim 4, wherein the signal components comprise:
a luminance signal component;
a first chrominance signal component; and
a second chrominance signal component.

6. The method of claim 1, wherein the generating the watermark parameters for the original multimedia data comprises:
determining reference values of the watermark parameters;
generating adjustment parameters; and
adjusting the reference values of the watermark parameters according to the adjustment parameters to obtain the watermark parameters.

7. A method comprising:
receiving a multimedia code stream to obtain watermark parameters carried in the multimedia code stream, the watermark parameters comprising: a watermark logo, a watermark position, a watermark size, and a watermark transparency;

removing the watermark parameters in the multimedia code stream to obtain a first multimedia code stream;

decoding the first multimedia code stream to obtain first multimedia data; and performing watermark inverse superposition processing on the first multimedia data according to the watermark parameters to obtain original multimedia data, performing the watermark inverse superposition processing on the first multimedia data comprises:

obtaining a watermark image to which the watermark logo corresponds;

adjusting a size of the watermark image according to the watermark size to obtain a first watermark image;

determining a to-be-adjusted area of a respective image in the first multimedia data according to the watermark position and the watermark size; and adjusting values of pixels in the to-be-adjusted area of the respective image according to the watermark transparency and the first watermark image.

8. The method of claim 7, wherein the inverse superposition processing is an inverse process of performing watermark superposition processing on the original multimedia data.

9. The method of claim 7, wherein the adjusting values of pixels in the to-be-adjusted area of the respective image according to the watermark transparency and the first watermark image comprises:

determining a third ratio and a fourth ratio according to the watermark transparency;

determining signal components to which a respective pixel in the to-be-adjusted area of the respective image corresponds;

determining signal components to which a respective pixel in the first watermark image corresponds, the respective pixel in the first watermark image corresponding to the respective pixel in the to-be-adjusted area;

determining a first signal component of signal components of the respective pixel in the to-be-adjusted area according to the third ratio and the signal components of the respective pixel in the to-be-adjusted area;

determining a second signal component of signal components of the respective pixel in the first watermark image according to the fourth ratio and the signal components of the respective pixel in the first watermark image; and determining a difference between a first signal component of signal components of the respective pixel in the to-be-adjusted area and a second signal component of signal components of the respective pixel in the first watermark image as a signal component of the respective pixel in the to-be-adjusted area after adjustment.

10. The method of claim 9, wherein the signal components comprise:

a luminance signal component;

a first chrominance signal component; and a second chrominance signal component.

11. A device comprising:

one or more processors;

memory storing thereon computer-readable instructions that, when executed by the one or more processors, cause the one or more processors to perform acts comprising:

generating watermark parameters for original multimedia data, the watermark parameters comprising: a watermark logo, a watermark position, a watermark size, and a watermark transparency;

performing watermark superposition processing on the original multimedia data according to the watermark parameters to obtain first multimedia data, wherein performing the watermark superposition processing on the original multimedia data comprises:

adjusting a size of a watermark image to which the watermark logo corresponds according to the watermark size to obtain a first watermark image;

determining a to-be-adjusted area of a respective image in the original multimedia data according to the watermark position and the watermark size; and adjusting values of pixels in the to-be-adjusted area of the respective image according to the watermark transparency and the first watermark image to obtain the first multimedia data;

encoding the first multimedia data to obtain a first multimedia code stream;

encapsulating the watermark parameters into the first multimedia code stream to obtain a second multimedia code stream; and sending the second multimedia code stream to a terminal device to enable the terminal device to perform watermark inverse superposition processing on the first multimedia data according to the watermark parameters to obtain the original multimedia data, the inverse superposition processing being an inverse process of performing watermark superposition processing on the original multimedia data.

12. The device of claim 11, wherein the adjusting values of the pixels in the to-be-adjusted area of the respective image according to the watermark transparency and the first watermark image comprises:

determining a first ratio and a second ratio according to the watermark transparency;

determining signal components to which a respective pixel in the to-be-adjusted area of the image corresponds;

determining signal components to which a respective pixel in the first watermark image corresponds, the respective pixel in the first watermark image corresponding to the respective pixel in the to-be-adjusted area;

determining a first signal component of the signal components of the respective pixel in the to-be-adjusted area according to the first ratio and the signal components of the respective pixel in the to-be-adjusted area;

determining a second signal component of the signal components of the respective pixel in the first watermark image according to the second ratio and the signal components of the respective pixel in the first watermark image; and determining a sum of the first signal component of the signal components of the respective pixel in the to-be-adjusted area and the second signal component of the signal components of the respective pixel in the first watermark image as a signal component of the respective pixel in the to-be-adjusted area after adjustment.

13. The device of claim 12, wherein the signal components comprise:

a luminance signal component;

a first chrominance signal component; and a second chrominance signal component.

14. The device of claim 11, wherein the generating the watermark parameters for the original multimedia data comprises:
- determining reference values of the watermark parameters;
- generating adjustment parameters; and
- adjusting the reference values of the watermark parameters according to the adjustment parameters to obtain the watermark parameters.

* * * * *